United States Patent
Saimi et al.

(10) Patent No.: US 6,661,750 B2
(45) Date of Patent: Dec. 9, 2003

(54) ABERRATION DETECTION DEVICE AND OPTICAL INFORMATION RECORDING AND REPRODUCING APPARATUS

(75) Inventors: Tetsuo Saimi, Osaka (JP); Shin-ichi Tanaka, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/183,136

(22) Filed: Jun. 25, 2002

(65) Prior Publication Data

US 2002/0176332 A1 Nov. 28, 2002

Related U.S. Application Data

(62) Division of application No. 09/389,121, filed on Sep. 2, 1999, now Pat. No. 6,430,137.

(30) Foreign Application Priority Data

| Sep. 4, 1998 | (JP) | 10-250750 |
| Sep. 18, 1998 | (JP) | 10-264625 |

(51) Int. Cl.$^7$ .................................... G11B 7/00
(52) U.S. Cl. ................ 369/44.23; 369/112.01; 369/112.1
(58) Field of Search .................... 369/44.23, 44.24, 369/112.01, 112.05, 112.04, 112.15

(56) References Cited

U.S. PATENT DOCUMENTS

| 5,120,128 A | 6/1992 | Ulich et al. |
| 5,126,996 A | 6/1992 | Iida et al. |
| 5,416,757 A | 5/1995 | Luecke et al. |
| 5,793,735 A | 8/1998 | Oono |
| 5,815,293 A | 9/1998 | Komma et al. |
| 5,818,643 A | 10/1998 | Fujioka |
| 5,838,651 A | 11/1998 | Takahashi |
| 5,946,137 A | 8/1999 | Momoo et al. |
| 6,069,860 A * | 5/2000 | Mizuno et al. ............. 369/112 |
| 6,111,842 A | 8/2000 | Nishino et al. |
| 6,185,176 B1 * | 2/2001 | Sugiura et al. ............. 369/112 |
| 6,327,231 B1 | 12/2001 | Sano et al. |

FOREIGN PATENT DOCUMENTS

| EP | 517491 | 12/1992 |
| EP | 545713 | 6/1993 |
| EP | 807928 | 5/1996 |
| EP | 720159 | 7/1996 |
| EP | 762403 | 9/1996 |
| EP | 765015 A1 | 3/1997 |
| EP | 844606 | 5/1998 |
| JP | 5-282705 | 10/1993 |
| JP | 10-289470 | 10/1998 |
| JP | 2001-507463 | 6/2001 |
| WO | 99/18466 | 4/1999 |

OTHER PUBLICATIONS

Numerical–Aperture Two–Element Objective Lens for the Optical Disk, Yamamoto et al., Jpn. J. Appl. Phys. vol. 36 (Jan. 1997) pp. 456–459.

* cited by examiner

*Primary Examiner*—Nabil Hindi
(74) *Attorney, Agent, or Firm*—Merchant & Gould, P.C.

(57) ABSTRACT

A returning light beam emitted by a light source and reflected by an optical disk is separated by a half mirror, and partitioned and deflected at a hologram into a light beam passing a first region and a light beam passing a second region. The light beam passing the first region is received by a plurality of photo-detectors, and the aberration is detected by comparing the resulting signals. Based on the aberration detection, the aberration of an optical system can be reduced by driving an aberration correction element in real-time.

24 Claims, 21 Drawing Sheets

ABERRATION DETECTION DEVICE AND OPTICAL INFORMATION RECORDING AND REPRODUCING APPARATUS

This application is a divisional of application Ser. No. 09/389,121, filed Sep. 2, 1999, now U.S. Pat. No. 6,430,137 which application(s) are incorporated herein by reference.

BACKGROUND OF THE INVENTION

1. Field of the Invention

The present invention relates to an aberration detection device for an optical system used for an optical information recording and reproducing apparatus for recording information on an optical information recording medium (also referred to as "information carrier" in the following), such as an optical disk, and/or reproducing recorded information.

The present invention also relates to an optical information recording and reproducing apparatus for recording large amounts of information on an optical information recording medium (information carrier) with laser light, and for reproducing the recorded information. This aspect relates in particular to an optical information recording and reproducing apparatus for an information carrier having a plurality of information recording layers, such as an optical disk.

2. Description of the Prior Art

First Aspect

A conventional aberration correction system for optical disks is published in Publication of Unexamined Japanese Patent Application (Tokkai) No. Hei 8-212611.

FIG. 20 is a diagram of such a conventional wavefront aberration correction method. In FIG. 20, numeral 801 denotes an optomagnetic disk, numeral 811 denotes a semiconductor laser, numeral 812 denotes a collimator lens for collimating the divergent light bundle emitted by the semiconductor laser 811 into a parallel light bundle, numeral 813 denotes an anamorphic prism for correcting the light bundle into a light bundle with circular cross section, numerals 814 and 816 denote reflecting mirrors, numeral 817 denotes an object lens, and numeral 818 denotes a liquid crystal element. Moreover, numeral 820 denotes a complex prism, numeral 822 denotes an APC sensor for detecting and controlling the power of the laser light, numeral 825 denotes a $\lambda/2$ plate, numeral 826 denotes a polarization beam splitter, numerals 829, 830, and 833 denote light receiving elements, numeral 850 denotes a liquid crystal control circuit, and numeral 854 denotes a microcomputer.

In the device in FIG. 20, the liquid crystal control circuit 850 is driven based on data from a memory to control the liquid crystal element 818 so as to perform aberration correction. In particular, when aberrations occur, the phase of the liquid crystal aberration correction element 818 is controlled by an open loop, so that the wavefront aberration becomes minimal. Also, to correct wavefront aberration changes due to temperature influences, the temperature is detected, and the wavefront aberration is corrected on the basis of the detected temperature and previously stored control data relating to the temperature.

In the example in FIG. 20, the signals from the light receiving elements 829 and 830 for signal detection and the light receiving element 833 for error signal detection are entered into the microcomputer 854, which determines the voltages that the liquid crystal control circuit 850 applies to the elements of the liquid crystal element 818, so that the detection signal of the light receiving elements is improved.

A method for detecting aberration disclosed in the same publication measures the wavefront aberration with an interference system. Moreover, after determining the disk type and the necessary data for controlling the liquid crystal so as to correct the wavefront aberration occurring when that disk type is used, the correction of the wavefront aberration is performed based on a pre-arranged table. To do so, a measurement device comprising an interference system is arranged on the outside to measure the wavefront aberration, but the publication does not disclose a specific configuration of the interference system.

To optimize the S/N ratio with these conventional aberration correction methods, the wavefront aberration is changed by trial and error, and a closed loop is formed that minimizes the wavefront aberration as a result.

However, judging with these methods whether the signal improves or deteriorates, the determination of the optimal point becomes tedious (i.e. trial and error), so that the detection takes time and it is not possible to perform control with a closed loop with fast response.

Second Aspect

Types of so-called read-only optical information recording media that reproduce signals using laser light include compact disks (CDs), laser disks (LDs), and digital video disks (DVDs).

Presently, the read-only optical information recording medium with the highest signal recording density on the market is the DVD-ROM with 4.7 GB.

Standardized formats for read-only DVDs with a diameter of 120 mm include the single-side single-layer type with 4.7 GB maximum user capacity, the double-side single-layer type with 9.4 GB maximum user capacity, and the single-side double-layer type with 8.5 GB maximum user capacity.

FIG. 21 shows an example of the structure of a single-side double layer optical disk. In this optical disk, by irradiating a laser beam from the side of a substrate 918, signals recorded in either a first information recording layer 919 or a second information recording layer 921 can be reproduced through the substrate 918. Between the first information recording layer 919 and the second information recording layer 921, an optical separation layer 920 is provided, which optically separates the laser light entering through the substrate 918 to the first information recording layer 919 and the second information recording layer 921. Below the second information recording layer 921, a protective substrate 922 for protecting the second information recording layer 921 is provided. A method for manufacturing such a multi-layered read-only optical disk is disclosed, for example, in U.S. Pat. No. 5,126,996.

Moreover, types of optical information recording media on which a signal can be recorded and reproduced using laser light include phase-changing optical disks, optomagnetic disks, and dye disks.

In recordable phase-changing optical disks, a chalcogen compound is normally used as a material for the recording thin film. Usually, the crystalline state of this recording thin film material is regarded as the unrecorded state, and signals are recorded by irradiating laser light and changing the recording thin film material into the amorphous state by melting and cooling it quickly. Conversely, to erase signals, laser light is irradiated at lower power than for the recording, and the recording thing film is crystallized.

As an attempt to increase the recording density of recordable or recordable/erasable optical disks, the so-called "land & groove recording" has been proposed (see for example Tokkai Hei 5-282705), wherein signals are recorded in both the guide grooves and the guide lands provided in a substrate surface.

Moreover, as an attempt to increase the recording capacity of recordable or recordable/erasable phase-changing optical disks, double-layer disks have been suggested (see for example Tokkai No. Hei 9-212917).

To raise the recording/reproducing density of these disks, it is desirable to perform recording and reproducing with an object lens that has a high numerical aperture (NA). Among conventional optical disk devices, there is no example of a device using an object lens with a NA that is high enough so that errors in the thickness of the substrate may have become a problem, and irregularities in the substrate thickness have not been a particular-problem.

An idea of how to correct spherical aberrations of a double-layer disk with the reproducing apparatus is mentioned in Tokkai Hei 7-77031. In this publication, a predicted aberration amount of spherical aberration that occurs when using an object lens and a double-layer disk is corrected. As an element for generating an optical phase difference to correct the aberration, a liquid crystal layer is mentioned in an example embodiment. For low NAs, this method provides sufficient correction.

This means, even when the disk substrate is produced with high precision, there are still thickness irregularities of normally 30 to 60 $\mu$m, and the thickness irregularities for CDs are about 100 $\mu$m. To reproduce a CD, a lens with an NA of 0.4 to 0.45 is used. In the case of a device for recordable CD-Rs, a lens with an NA of about 0.5 is used. In the case of DVDs, a lens with a NA of 0.6 is used, because of the high density of the DVD. For disks with thickness irregularities in the range of about 30–100 $\mu$m, acceptable recording and reproduction can be performed with recording/reproduction system having a NA of not more than 0.6. However, when the NA is more than 0.6, the thickness irregularities of the substrate and the aberrations intrinsic to the lens itself become a problem.

With the method disclosed in Tokkai 7-77031, it is not possible to correct the spherical aberrations that occur when the thickness of the substrate changes. Moreover, because the correction element is arranged within the optical system, the spherical aberration correction element has an optical axis that is different from the optical axis of the object lens, so that the spherical aberration, which varies in proportion to the fourth power of the NA, becomes large, and this method becomes unsuitable for optical systems with a high NA.

The idea of doubling the recording capacity of recordable/erasable optical disks with a double-layer structure already has been proposed (see, for example, Tokkai Hei 9-212917), but since a method solving the following problems has not yet been found, it has not been put into practice. In the present invention, "first information recording layer" means a first recordable layer, seen from the side where the laser light for recording and reproduction enters the recording medium, and "second information recording layer" means a recordable layer behind the first information recording layer, seen from the side where the laser light for recording and reproduction enters the recording medium. In particular, those problems are:

1. No means has been found for performing recording and reproduction with the same suitable level for both the first and the second information recording layer, using an object lens with high NA in the optical system for recording, erasing and reproducing signals.
2. No means has been found for reducing spherical aberration for both the first and the second information recording layer, using an object lens with high NA in the optical system for recording, erasing and reproducing signals.
3. No configuration for an optical system that can overwrite the first and the second information recording layers at high speeds has been found.

An optical information recording medium in accordance with the present invention comprises a first information recording layer, an optical separation layer, a second information recording layer, and possibly more information recording layers, each two neighboring information recording layers being separated by an optical separation layer, formed in this order on a substrate. The information recording layers comprise a material with which information can be recorded and reproduced. Typical materials for the information recording layers are recording materials, in which a reversible phase-change between an amorphous state and a crystalline state can be caused by irradiation with laser light, so that signals can be recorded, erased or reproduced by irradiation with laser light through the substrate.

If recording and reproducing is performed with an optical disk having such a substrate, aberration occurs depending on how much the actual thickness deviates from the design thickness of the substrate used for designing the lens (in the following also referred to as "substrate design thickness").

When the deviation of the substrate thickness from the substrate design thickness is t, the refractive index of the substrate is n, and the numerical aperture of the object lens is NA, then the spherical aberration $W_{40}$ generated at this NA can be expressed by $$W_{40}=(\tfrac{1}{8})(1/n-1/n^3)t(NA)^4$$

When this aberration exceeds 35 m$\lambda$ (millilambda), wherein $\lambda$ is the operation wavelength, it adversely affects the recording and reproduction characteristics considerably.

For example, if NA=0.60, n=1.5, and $W_{40}$=35 m$\lambda$, then t=14.5 $\mu$m.

Considering, for simplicity, a double-layer disk having two information recording layers, if the substrate design thickness is just about half the width of the double-layer disk, then the maximum change in the thickness is ±14.5 $\mu$m, so that the thickness between the two layers has to be less than 29 $\mu$m. If, however, the thickness between the two layers is small, then the interferences between the layers become large, which adversely affects the recording and reproduction properties. For example, assuming that the distance between the layers is about 10 $\mu$m, stray light from one layer influences the focus servo for recording/reproducing the other layer, so that it is not possible to perform adequate recording and reproduction.

Consequently, a thickness between the layers that is tolerable in practice is 15 $\mu$m to 29 $\mu$m, but to actually manufacture such a disk leads to considerable difficulties.

SUMMARY OF THE INVENTION

First Aspect

It is an object of the invention to solve this problem of the prior art, and to provide an aberration detection device wherein aberrations are detected in real-time or a time equivalent to real-time, and that can be controlled with a high-speed closed loop.

To achieve these objects and as a method for detecting aberration in real-time, the present invention takes advantage from the fact that the distribution of the light reflected from the optical disk has particularities depending on the aberration, and detects aberration by detecting this distribution. Even when it is difficult to quantify the amount of aberration, this method allows comparatively easy detection of the type of aberration present, and whether a particular type of aberration is above a certain value.

Using this aberration detection, an aberration correction element can be driven in real-time or a time equivalent to real-time to correct aberration, improve the properties of the focussed light beam, and eventually achieve favorable optical recording properties and a favorable reproduction signal.

A first configuration of an aberration detection device in accordance with the first aspect of the invention comprises a radiation source for emitting a light beam; an object lens for focussing the light beam on an information carrier; a light beam splitter for separating a returning light beam that has been reflected by the information carrier and passed through the object lens from an incoming light beam; a light deflector for partitioning and deflecting the returning light beam, that has been separated by the light beam splitter, into a light beam passing a first region and a light beam passing a second region; and a plurality of light detectors for receiving a deflected light beam passing through the first region; wherein an aberration is detected by comparing signals from the plurality of light detectors.

Alternatively, a second configuration of an aberration detection device in accordance with the first aspect of the invention comprises a radiation source for emitting a light beam; an object lens for focussing the light beam on an information carrier; a light deflector for partitioning a returning light beam that has been reflected by the information carrier and passed through the object lens into a light beam passing a first region and a light beam passing a second region, and deflecting the light beam passing the first region away from the radiation source; and a plurality of light detectors for receiving a deflected light beam passing through the first region; wherein an aberration is detected by comparing signals from the plurality of light detectors.

With these first and second configurations, it is possible to detect the aberrations in an optical system in real-time or in a time that is close to real-time. Consequently, if an aberration correction element is driven on the basis of the detection results, the aberration of the optical system can be reduced. Thus, it becomes possible to reproduce information carriers (disks) with large surface warps or information carriers (disks) with different substrate thicknesses, which used to be difficult in the past. Moreover, it becomes easier to manufacture information carriers, because the tolerances for the information carriers can be relaxed.

In the first and second configuration, it is preferable that the light deflector is a hologram for partitioning and diffracting a light beam into a plurality of light beams. By using such a hologram element, a light beam can be efficiently partitioned with one element, so that a compact optical system can be devised.

In the first and second configuration, it is preferable that the plurality of light detectors comprises a photo-detector partitioned into at least two portions, and the light beam passing the first region is irradiated onto a partition line of the at least two portions. With this configuration, the distribution of the light beam spot changes in the case of aberration, and a difference in the output of the at least two portions of the photo-detector occurs. Thus, aberrations can be detected reliably with a simple configuration by detecting this difference.

In the first and second configuration, it is preferable that the first region is a substantially central portion of one of two regions that are attained by partitioning a region passed by the returning light beam with a plane including an optical axis of the returning light beam into two regions. With this configuration, it is possible to detect coma aberration.

In the first and second configuration, it is preferable that the first region is substantially equal to one of the two regions that are attained by partitioning, with a plane including an optical axis of the returning light beam, a region that is bounded by two concentric circles of different radii whose center is an optical axis of the returning light beam. With this configuration, it is possible to detect spherical aberration.

In the first and second configuration, it is preferable that the light deflector is a blazed hologram. With this configuration, the deflector is more efficient than a regular hologram, so that aberration can be detected with higher sensitivity.

In the second configuration, it is preferable that the plurality of light detectors is arranged symmetrically with regard to the radiation source and near the radiation source. With this configuration, +1-order diffractive light and −1-order diffractive light occurring at positions symmetrical to the radiation source with the same diffraction efficiency can be received with high efficiency when using a hologram for the light deflector. Thus, an optical system with good efficiency can be devised.

In the second configuration, it is preferable that the light deflector comprises a hologram for diffracting light of a predetermined polarization and a λ/4 plate, the hologram does not diffract an incoming light beam emitted by the radiation source and travelling toward the information carrier, and the hologram partitions the returning light beam into a plurality of light beams and diffracts the plurality of light beams into different directions. With this configuration, the optical efficiency of the optical system can be improved.

Second Aspect

It is another object of the invention to provide an optical information recording and reproducing apparatus, which can reliably record and reproduce information on an information carrier having two or more information recording layers, while correcting spherical aberration caused by thickness irregularities.

The second aspect of the invention provides an optical device that removes the influence of spherical aberration and corrects spherical aberration, so that recording and reproduction of a multi-layer information carrier becomes possible. There are several ways to correct spherical aberration. Here, a method for correcting spherical aberration by adjusting the position of the lens system on the optical axis, and a method for correcting spherical aberration by correcting the optical phase of the light beam entering the object lens are provided.

To change the distance between lenses, a micro-machine, an electromagnetic actuator, a piezo element, or an ultrasonic wave motor can be used.

To correct the optical phase of the light beam entering the object lens, it is necessary to change the phase distribution of the light beam. To do so, the effective portion of the light beam is partitioned into small regions, and the phase lead or phase lag of these regions is corrected. It is possible to use for example a liquid element for the element for performing such phase correction.

A first configuration of an optical information recording and reproducing apparatus in accordance with the second aspect of the invention (i) records information onto a recordable and reproducible information carrier having a plurality of information recording layers, and an optical separation layer sandwiched between the information recording layers and/or (ii) reproduces the recorded information; the optical information recording and reproducing apparatus and comprises a radiation source for emitting a light beam; a light beam focussing system for focussing a light beam emitted by the radiation source onto at least one of the plurality of information recording layers; and a spherical aberration correction system formed in one piece with the light beam focussing system. With this configuration, favorable recording and reproducing properties can be attained by correcting the aberration with a spherical aberration correction system and reducing the spherical aberration with regard to an information recording layer, even when the thickness of the information carrier deviates from the substrate design thickness. Thus, even when spherical aberration is caused by irregularities of the substrate thickness, recording and reproduction of every information recording layer can be performed reliably from one side of an information carrier having a plurality of information recording layers. As a result, an optical information recording medium with large capacity and an optical information recording and reproducing device therefore can be realized.

In this first configuration, it is preferable that the light beam focussing system comprises two groups of convex lenses, and the spherical aberration correction system changes the distance between the two groups of convex lenses. Changing the distance between two groups of convex lenses changes the spherical aberration. Consequently, optimum recording and reproduction can be performed by automatically adjusting this distance so that the spherical aberration for the recordable information recording layer of the optical disc becomes minimal.

In this first configuration, it is preferable that the light beam focussing system comprises two aspherical lenses, and the spherical aberration correction system changes the distance between the two aspherical lenses. To make an object lens with a high NA, it is possible to combine a plurality of convex lenses, and the above configuration is suitable for this case. When using aspherical lenses, two lenses are sufficient. An optimization of the distance between these two aspherical lenses minimizes the spherical aberration.

In this first configuration, it is also preferable that the light beam focussing system comprises an aspherical lens and a spherical lens, and the spherical aberration correction system changes the distance between the aspherical lens and the spherical lens. To make an object lens with a high NA, it is possible to combine an aspherical lens with a spherical lens. An optimization of the distance between the aspherical lens and the spherical lens minimizes the spherical aberration.

A second configuration of an optical information recording and reproducing apparatus in accordance with the second aspect of the invention (i) records information onto a recordable and reproducible information carrier having a plurality of information recording layers, and an optical separation layer sandwiched by the information recording layers and/or (ii) reproduces the recorded information; the optical information recording and reproducing apparatus comprising a radiation source for emitting a light beam; a light beam focussing system for focussing a light beam emitted by the radiation source onto at least one of the plurality of information recording layers; and a spherical aberration correction system formed in one piece with the light beam focussing system and arranged between the radiation source and the light beam focussing system; wherein the spherical aberration correction system can change an optical phase that is constant in a circumferential direction, and varies in a radial direction, with respect to an optical axis of the light beam focussing system. With this configuration, the spherical aberration can be cancelled or reduced by adding an optical phase of the same amount but of opposite polarity as the optical phase distribution in radial direction around the optical axis, which is caused by the spherical aberration, so the optical distribution within the aperture becomes uniform. As a result, the aberration is corrected by the spherical aberration correction system, and spherical aberration with respect to the information recording layer can be decreased, so that favorable recording and reproducing properties can be attained, even in the case of an information carrier whose thickness deviates from the substrate design thickness. Thus, recording and reproduction of every information recording layer can be performed reliably from one side of the information carrier having a plurality of information recording layers, even when spherical aberration occurs due to irregularities of the substrate thickness. As a result, an optical information recording medium with large capacity and an optical information recording and reproducing device therefore can be realized.

DESCRIPTION OF THE PREFERRED EMBODIMENTS

The following is an explanation of the preferred embodiments of the present invention with reference to the accompanying drawings.

Embodiment 1

Figure 1:
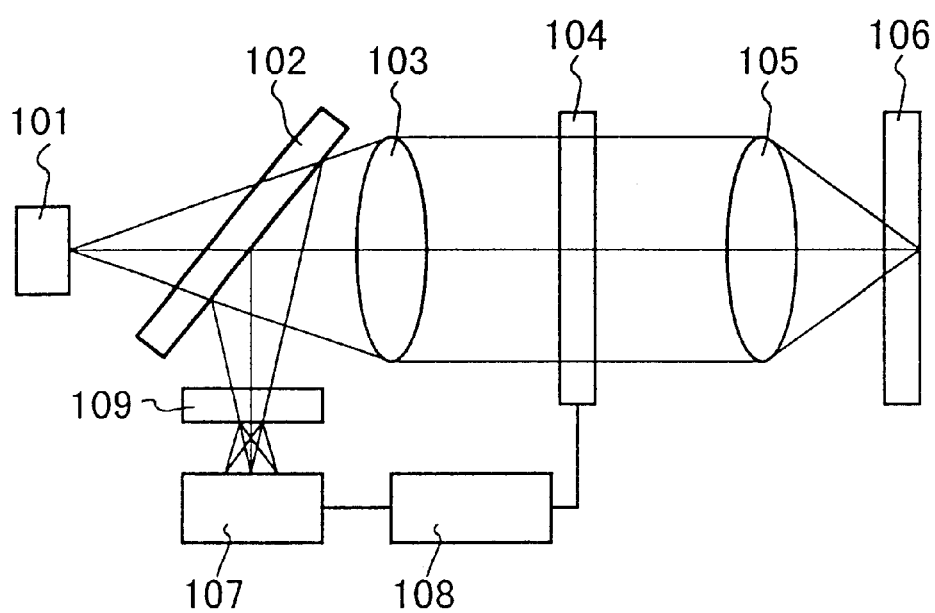
FIG. 1 is a diagram showing an aberration detection device in accordance with Embodiment 1 of the present invention.

FIG. 1 is a schematic diagram of an aberration detection device in accordance with Embodiment 1.

A light beam emitted from a light source 101, for example a semiconductor laser, passes a half-mirror 102, is collimated by a collimator lens 103 into a substantially parallel light beam, is transmitted through a wavefront transformer element 104, focussed by an object lens 105, and irradiated onto an information recording/reproduction plane behind a substrate of an optical disk 106.

The light beam reflected by the information recording/reproduction plane is again transmitted through the substrate, the object lens 105, the wavefront transformer element 104, and the collimator lens 103, reflected by the half-mirror 102, transmitted through and diffracted by a hologram 109, and irradiated onto a photo-detector 107 for detecting optical signals. The photo-detector 107 comprises photo-detecting elements, such as p-i-n diodes, for detecting information signals, control signals such as focus signals or tracking signals, and aberration of the light beam. These detecting elements can detect each kind of signal separately, or their functions can be integrated so that one element fulfills several functions. The detected aberration is processed by a signal processing circuit 108, and drives the wavefront transformer element 104.

For the wavefront transformer element 104, a liquid crystal is filled into a portion that is sandwiched by two glass substrates. The wavefront transformer element 104 can be operated as explained below. If the portions of the wavefront transformer element 104 through which the light beam is transmitted are partitioned into a plurality of regions and an independent voltage is applied to each region, then the corresponding refractive index of these portions can be changed individually. Using this change of the refractive index, the phase of the wavefront can be changed. Since the phases of the light beam partially change in the case of an aberration of the light beam, aberrations can be corrected by driving the wavefront transformer element 104 so as to compensate the changed phases of the light beam. If a voltage proportional to the extent of aberration is applied, aberrations can be corrected more precisely.

If there is no aberration in the optical system, the photo-detector 107 detects no aberrations, and therefore the wavefront transformer element 104 stays unchanged, that is, an element equivalent to a simple parallel glass plate. However, when aberration occurs, the detection signal depends on the kind of the aberration.

The following is an explanation of three typical examples of aberrations.

The first example is coma aberration, which occurs, for example, when the optical disk 106 is tilted, and a light beam passes through the substrate of the optical disk. The coma aberration is detected with the photo-detector 107, and it can be corrected by driving the wavefront transformer element 104 so as to cancel it. As a way to transform the wavefront so as to correct the coma aberration, a method can be employed that uses a wavefront transformer element made of a liquid crystal that is partitioned into a plurality of regions.

The following is an explanation of a method for detecting coma aberration.

Figure 2:
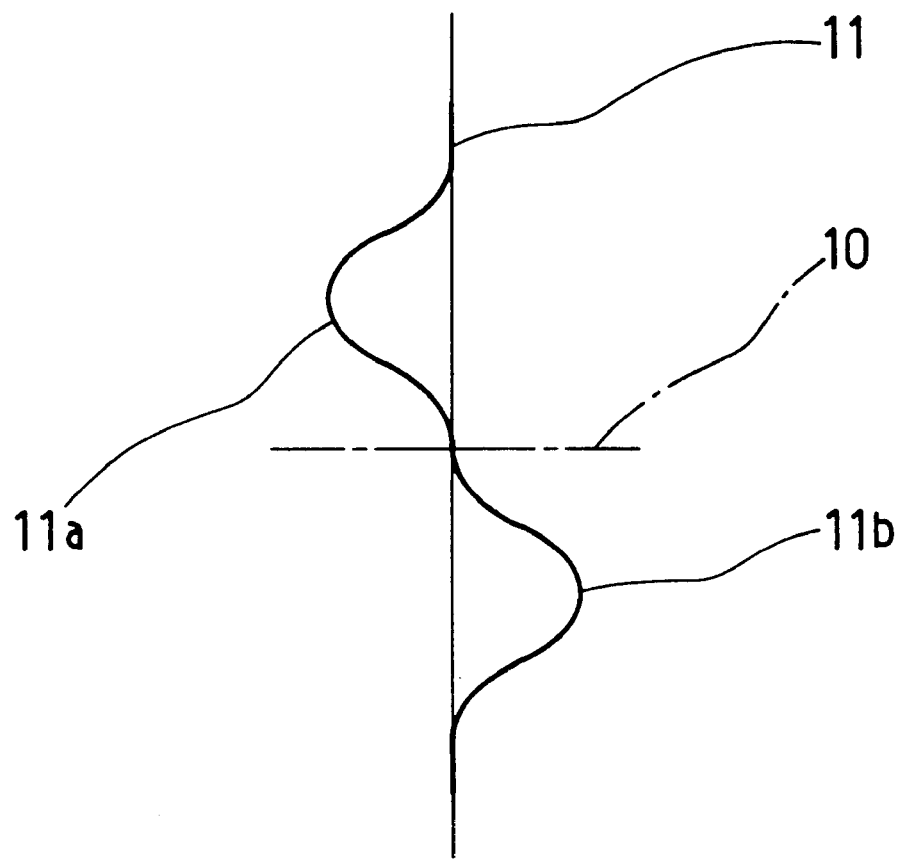
FIG. 2 is a diagram illustrating the wavefront aberration in the case of coma aberration.

FIG. 2 illustrates the wavefront aberration for coma aberration. With respect to a reference wavefront 11 in an aperture, and an optical axis 10 as the border, there is a leading wavefront 11a, and a lagging wavefront 11b. When the reference wavefront 11 is focussed, the focus positions of both the leading wavefront 11a and the lagging wavefront 11b become defocused with respect to the focal point of the reference wavefront 11. Consequently, by extracting the leading wavefront or the lagging wavefront, and detecting how they focus, it can be determined how coma aberration occurs.

Figure 3:
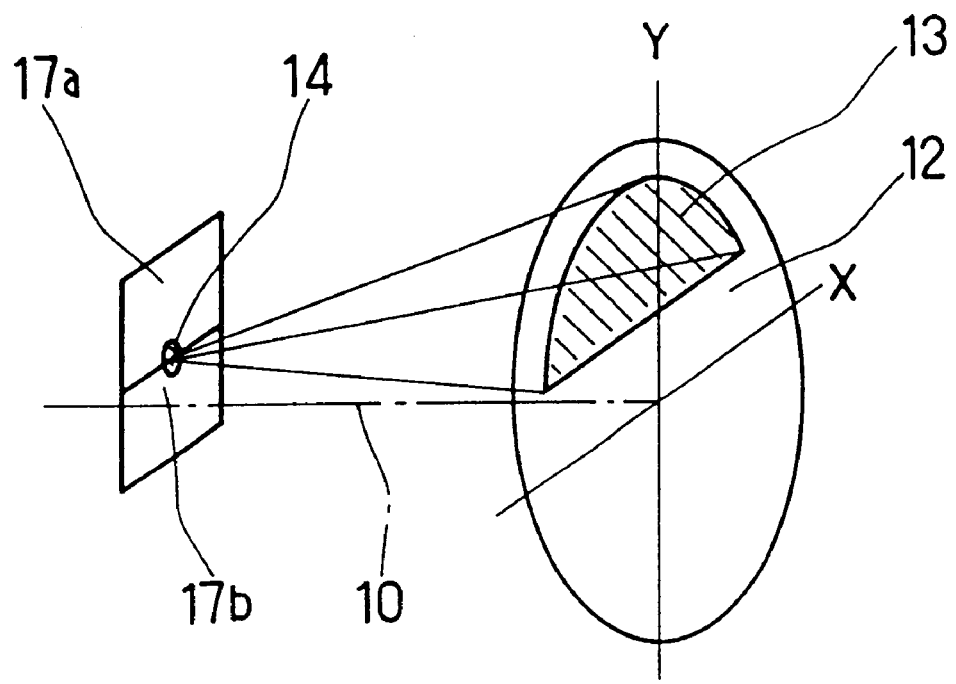
FIG. 3 is a diagram showing an example of an optical system for detecting coma aberration.

FIG. 3 illustrates an example of an optical system for detecting coma aberration. The optical axis 10 intersects with the point of origin of an X-Y coordinate system. Let us assume that coma aberration occurs in the direction of the Y-axis. After being reflected from an optical disk, the focussed returning light beam 12 is partitioned into a light beam passing a substantially central portion 13 of a region where Y>0 and a light beam passing the region outside the region 13. The former is focussed onto the photo-detectors 17a and 17b, which are partitioned by a partition line, thereby forming the light spot 14. If there is no aberration, the light spot 14 focuses onto the partition line between the photo-detectors 17a and 17b. If there is coma aberration in the Y-axis direction, the phase of the light beam passing the region 13 is either leading or lagging compared to the phase of the light beam passing through the region outside the region 13. In other words, the region 13 is arranged such that a portion of the light with leading or lagging phase can be extracted. In the example in FIG. 3, the region 13 is shown to be semicircular, but there is no limitation to this shape, and the region 13 also can be circular, elliptical, rectangular, arc-shaped, or of any other suitable shape.

Figure 4:
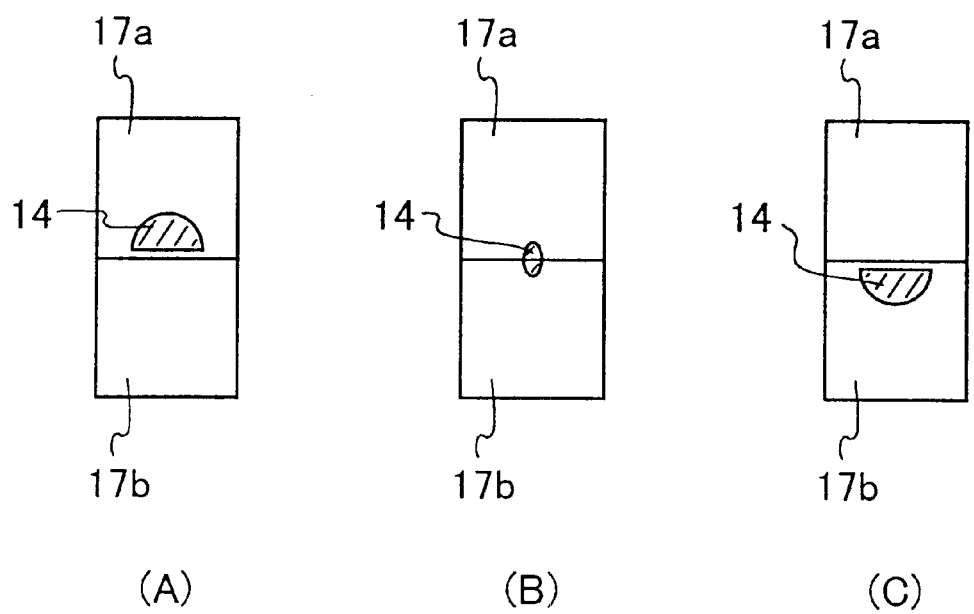
FIG. 4 illustrates the shape and the position of the light beam spot formed on the photo-detector of FIG. 3, which is partitioned into two portions.

FIG. 4 illustrates the shape and the position of the light beam 14 irradiated on a photodetector partitioned into two portions.

FIG. 4(A) illustrates the case that the phase of the light beam passing the region 13 is lagging, so that this light beam focuses behind the detection plane of the photo-detectors. Since, in this case, the light beam passes mainly through the photo-detector 17a, the output of the photo-detector 17a becomes larger than the output of the photo-detector 17b.

FIG. 4(B) illustrates the case that the phase of the light beam passing the region 13 is neither lagging nor leading (which means that there is no aberration), so that the light beam focuses on the detection plane of the photo-detectors 17a and 17b, and on the partition line between the photo-detectors 17a and 17b. The output of the photo-detector 17a becomes equal to the output of the photo-detector 17b.

FIG. 4(C) illustrates the case that the phase of the light beam passing the region 13 is leading, so that this light beam focuses in front of the detection plane of the photo-detector. Since, in this case, the light beam passes mainly through the photo-detector 17b, the output of the photo-detector 17a becomes smaller than the output of the photo-detector 17b.

Thus, by detecting the difference of the output signals of the two photo-detectors 17a and 17b, the amount and the polarity of the coma aberration can be determined for small coma aberrations. If the aberration exceeds a certain level, the difference signal saturates, and even though it is still possible to determine the polarity of the coma aberration, it becomes impossible to determine the amount of the coma aberration. In this case, the amount of the coma aberration can be determined by further partitioning the photo-detectors and calculating the coma aberration from their respective output signals.

Referring to FIG. 1, the second example is spherical aberration, occurring, for example, when the thickness of the optical disk 106 varies, and the light beam passes through the substrate. This spherical aberration is detected with the photo-detector 107, and it can be corrected by driving the wavefront transformer element 104 so as to cancel it. As a way to transform the wavefront so as to correct spherical aberration, a method can be employed that uses a wavefront transformer element made of a liquid crystal that is partitioned into a plurality of regions.

The following is an explanation of a method for detecting spherical aberration.

Figure 5:
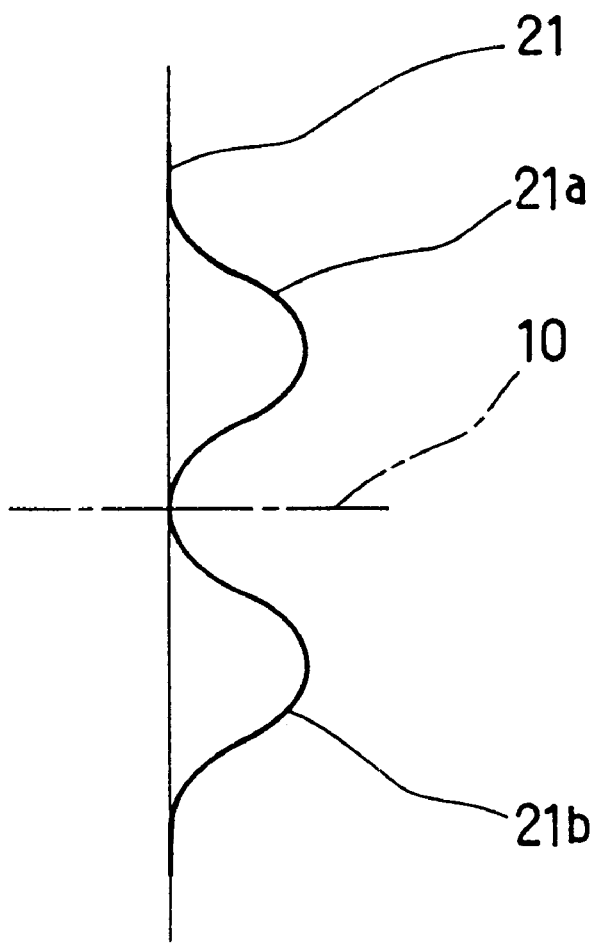
FIG. 5 is a diagram illustrating the wavefront aberration in the case of spherical aberration.

FIG. 5 illustrates the wavefront aberration for spherical aberration. With respect to a reference wavefront 21 in an aperture, there are two lagging wavefronts 21 and 21b, symmetrical to the optical axis 10. When the reference wavefront 21 is focussed, the focus positions of the lagging wavefronts 21a and 21b become defocused with respect to the focal point of the reference wavefront 21. Consequently, by extracting the lagging wavefronts, and detecting how they focus, it is possible to assess the spherical aberration. Conversely to this case, wavefront aberration occurs also in the case that the wavefront leads symmetrically to the optical axis 10.

Figure 6:
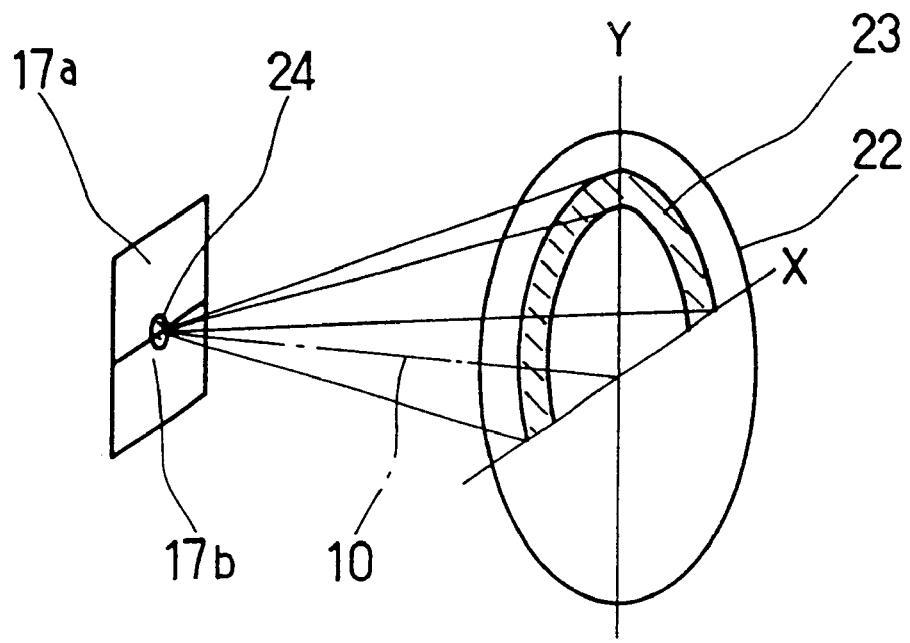
FIG. 6 is a diagram showing an example of an optical system for detecting spherical aberration.

FIG. 6 illustrates an example of an optical system for detecting spherical aberration. The optical axis 10 intersects with the point of origin of an X-Y coordinate system. After being reflected from an optical disk, the focussed returning light beam 22 is partitioned into a light beam passing through a region 23 (half-ring-shaped region), which is bounded by two concentric circles with different diameter and the optical axis 10 in the center and where Y>0, and a light beam passing the region outside the region 23. The former is focussed onto two partitioned photo-detectors 17a and 17b, thereby forming a light spot 24. If there is no aberration, the light spot 24 focuses onto the partition line between the photo-detectors 17a and 17b. If there is spherical aberration, the phase of the light beam passing the region 23 is either leading or lagging compared to the phase of the light beam passing through the region outside the region 23. In other words, the region 23 is arranged such that a portion of the light with leading or lagging phase can be extracted. The ring radius of the half-ring-shaped region 23 and the radial width of the region 23 can be adjusted in accordance with the state of the wavefront aberration of the light beam.

Figure 7:
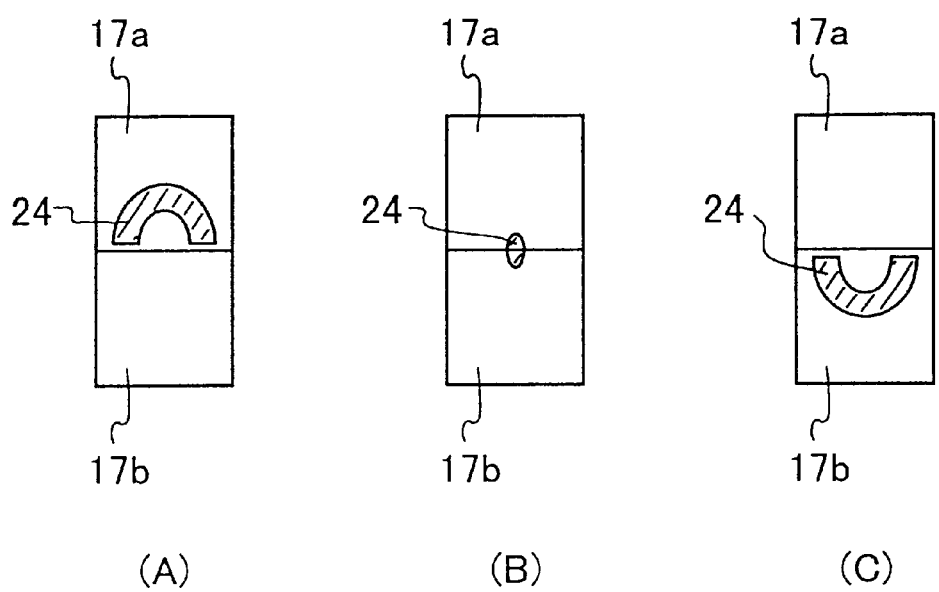
FIG. 7 illustrates the shape and the position of the light beam spot formed on the photo-detector of FIG. 6, which is partitioned into two portions.

FIG. 7 illustrates the shape and the position of a light beam 24 on the partitioned photo-detectors.

FIG. 7(A) illustrates the case in which the phase of the light beam passing the region 23 is lagging, so that this light beam focuses behind the detection plane of the photo-detectors. Since, in this case, the light beam passes mainly through the photo-detector 17a, the output of the photo-detector 17a becomes larger than the output of the photo-detector 17b.

FIG. 7(B) illustrates the case in which the phase of the light beam passing the region 23 is neither lagging nor leading (which means that there is no aberration), so that the light beam focuses on the detection plane of the photo-detectors 17a and 17b, and on the partition line between the photo-detectors 17a and 17b. In this case, the output of the photo-detector 17a becomes equal to the output of the photo-detector 17b.

FIG. 7(C) illustrates the case in which the phase of the light beam passing the region 23 is leading, so that this light beam focuses in front of the detection plane of the photo-detector. Since, in this case, the light beam passes mainly through the photo-detector 17b, the output of the photo-detector 17a becomes smaller than the output of the photo-detector 17b.

Thus, by detecting the difference of the output signals of the two photo-detectors 17a and 17b, the amount and the polarity of the spherical aberration can be assessed for small spherical aberrations. If the aberration exceeds a certain level, the difference signal saturates, and even though it is still possible to determine the polarity of the spherical aberration, it becomes impossible to determine the amount of the spherical aberration. In this case, the amount of the spherical aberration can be determined by further partitioning the photo-detectors and calculating the spherical aberration from their respective output signals.

Referring again to FIG. 1, the third example is astigmatism, occurring for example due to birefringence of the optical disk 106 when the light beam passes through the substrate. Astigmatism can be detected with the photo-detector 107, and it can be corrected by driving the wavefront transformer element 104 so as to cancel it. As a way to transform the wavefront so as to correct astigmatism, a method can be employed that uses a wavefront transformer element made of a liquid crystal that is partitioned into a plurality of regions.

The method for detecting astigmatism can be performed on the basis of the same principles as for the methods for detecting coma aberration or spherical aberration.

The hologram 109 serving as the light deflector in FIG. 1 also can be a blazed hologram. This makes it a deflector with better efficiency than a regular hologram.

Moreover, the photo-detector 107 comprises photo-detecting elements, such as p-i-n diodes, for detecting information signals, control signals, such as focus signals or tracking signals, and aberrations of the light beam. The photo-detecting elements are partitioned into a plurality of regions. The portion for detecting aberrations is partitioned into at least two photo-detecting elements, and the light beam deflected at the hologram 109 is adjusted to reach the partition line between those at least two photo-detecting elements.

Embodiment 2

Figure 8:
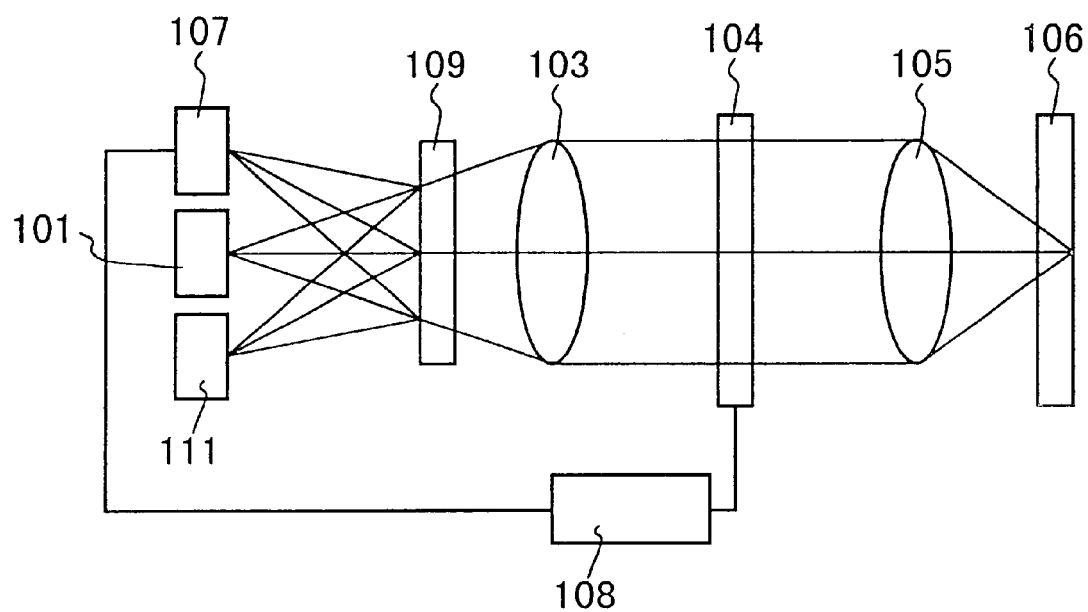
FIG. 8 is a diagram showing an aberration detection device in accordance with Embodiment 2 of the present invention.

FIG. 8 is a diagram of an aberration detection device according to Embodiment 2.

A light beam emitted from a light source 101, for example a semiconductor laser, passes through a hologram 109, is collimated by a collimator lens 103 into a substantially parallel light beam, is transmitted through a wavefront transformer element 104, focussed by an object lens 105, and irradiated onto an information recording/reproduction plane behind a substrate of an optical disk 106.

The light beam reflected by the information recording/reproduction plane is again transmitted through the substrate, the object lens 105, the wavefront transformer element 104, and the collimator lens 103, diffracted by the hologram 109, and irradiated onto photo-detectors 107 and 111 for detecting optical signals. The photo-detectors 107 and 111 comprise elements for detecting information signals, control signals such as focus signals or tracking signals, and aberrations of the light beam. These detecting elements can detect each kind of signal separately, or their functions can be integrated so that one element fulfills several functions. The detected aberration is processed by a signal processing circuit 108, and drives the wavefront transformer element 104.

If there is no aberration in the optical system, the photo-detectors 107 and 111 detect no aberrations, and the wavefront transformer element 104 stays unchanged, that is, an element equivalent to a simple parallel glass plate. However, when aberrations occur, they are detected by the same detection method as explained for Embodiment 1.

With this Embodiment 2, an aberration detection device can be obtained that is even more compact than that of Embodiment 1.

Embodiment 3

Figure 9:
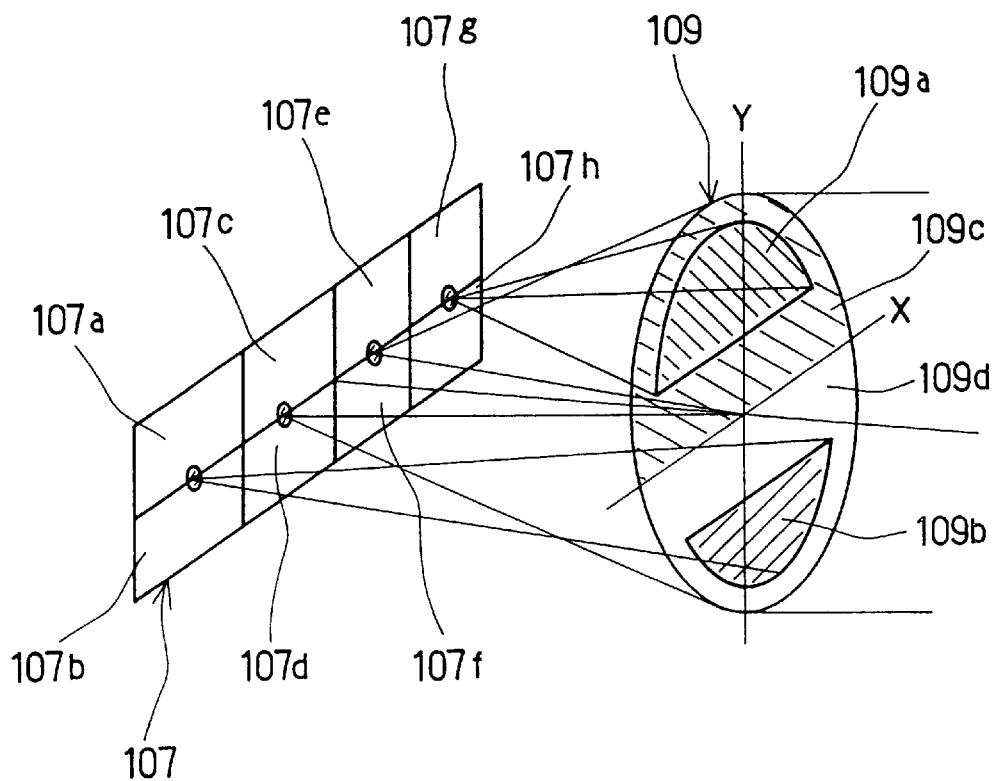
FIG. 9 is a diagram illustrating the principle for detecting coma aberration in Embodiment 3 of the present invention.

FIG. 9 illustrates a method for detecting coma aberration.

The hologram 109 is partitioned into a plurality of regions 109a 109d, and the photo-detectors 107a–107h correspond to these regions. That is, the region 109a corresponds to the photo-detectors 107g and 107h, the region 109b corresponds to the photo-detectors 107a and 107b, the region 109c corresponds to the photo-detectors 107e and 107f, and the region 109d corresponds to the photo-detectors 107c and 107d. The partitioning of the hologram 109 into different regions follows the principle illustrated by FIG. 3. Thus, to partition and deflect a plurality of light beams according to the regions they pass, for example the spatial frequency (pitch) and diffraction direction of the hologram 109 can be adjusted to suitable values for each region.

Assuming that coma aberration occurs with respect to the Y-axis direction, the phase difference between the regions 109a and 109b on the detection hologram 109 becomes maximal, while the phase difference between the regions 109c and 109d is comparatively small. Consequently, if these four regions are measured, coma aberration can be detected. Since the coma aberration is symmetrical to the X-axis, it can be detected with a combination of regions 109a and 109c. Similarly, it can be detected with a combination of regions 109b and 109d.

The photo-detectors 107 are located near the focal point of the light beam and use the so-called "knife edge method" for detection.

The far-field tracking error signal can be obtained by detecting the difference in the light amounts of the light beam passing the portion of the hologram where Y>0 and light beam passing the portion of the hologram where Y<0. That is, the far-field tracking error signal TE can be determined by $$TE=[(107a)+(107b)+(107c)+(107d)]-[(107e)+(107f)+(107g)+(107h)]$$

Figure 10:
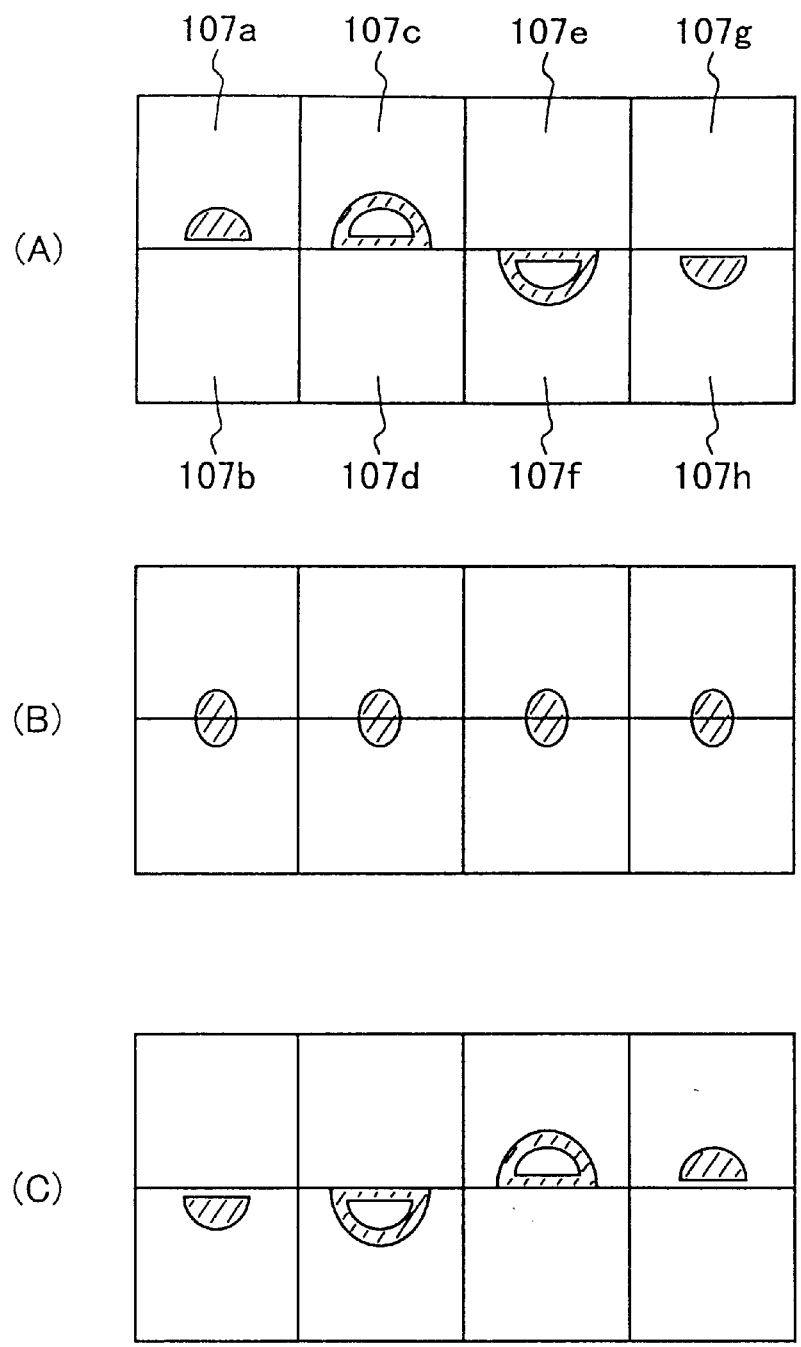
FIGS. 10(A)–(C) illustrate how the light beam spot is formed on the photo-detector of FIG. 9 in the case of focus detection with the knife edge method.

FIG. 10 illustrates the appearance of the light spots (hatched portion) of the light beam on the photo-detector 107 for the case of a focus detection with the knife edge method. Assuming that there is no coma aberration, all light beams focus on the partition line of the partitioned photo-detectors, as shown in FIG. 10(B). If the focus shifts, for example when the optical disk 106 and the object lens 105 come closer to each other, the output of the elements 107a, 107c, 107f, and 107h becomes larger, as shown in FIG. 10(A). If the distance between the optical disk 106 and the object lens 105 increases, the output of the elements 107b, 107d, 107e, and 107g becomes larger, as shown in FIG. 10(C). Consequently, a focus signal can be obtained by processing these signals. In other words, the focus signal FE can be determined by $$FE=[(107c)+(107f)]-[(107d)+(107e)]$$

Figure 11:
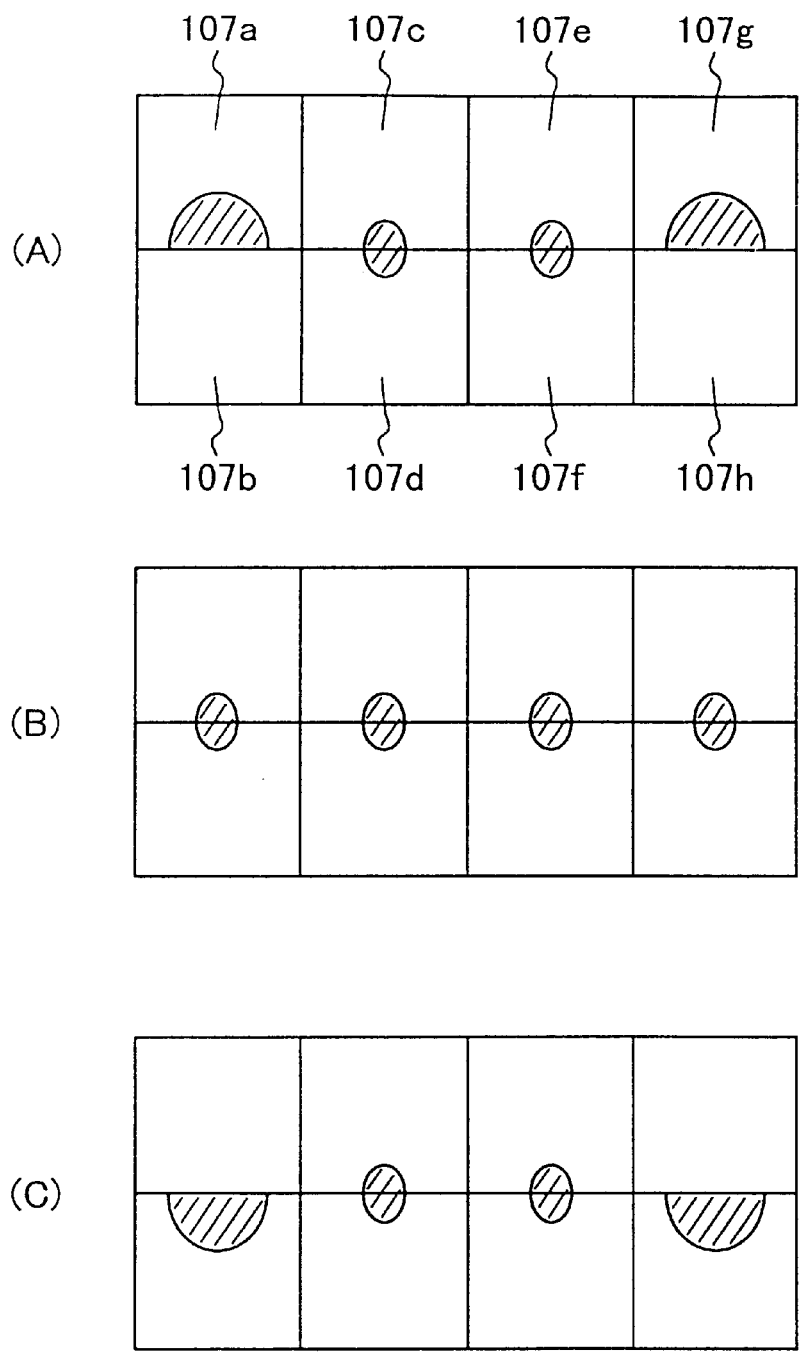
FIGS. 11(A)–(C) illustrate how the light beam spot is formed on the photo-detector of FIG. 9 during coma aberration.

FIG. 11 illustrates the appearance of the light spot (hatched portions) due to the light beam on the photo-detector 107, on which the light beam is focussed.

If there is no coma aberration, the output of all photo-detectors is roughly equal, as shown in FIG. 11(B).

In the case of coma aberration of a certain polarity, the output of the photo-detectors 107a and 107g increases and the output of the photo-detectors 107b and 107h decreases, but the output of the photo-detectors 107c, 107d, 107e, and 107f stays the same, as shown in FIG. 11(A).

When coma aberration of the opposite polarity occurs, the output of the photo-detectors 107b and 107h increases and the output of the photo-detectors 107a and 107g decreases, but the output of the photo-detectors 107c, 107d, 107e, and 107f stays the same, as shown in FIG. 11(C).

That is, the signal for the coma aberration detection can be determined by processing these signals. The coma aberration CM can be determined by $$CM=[(107a)+(107g)]-[(107b)+(107h)]$$

Embodiment 4

Figure 12:
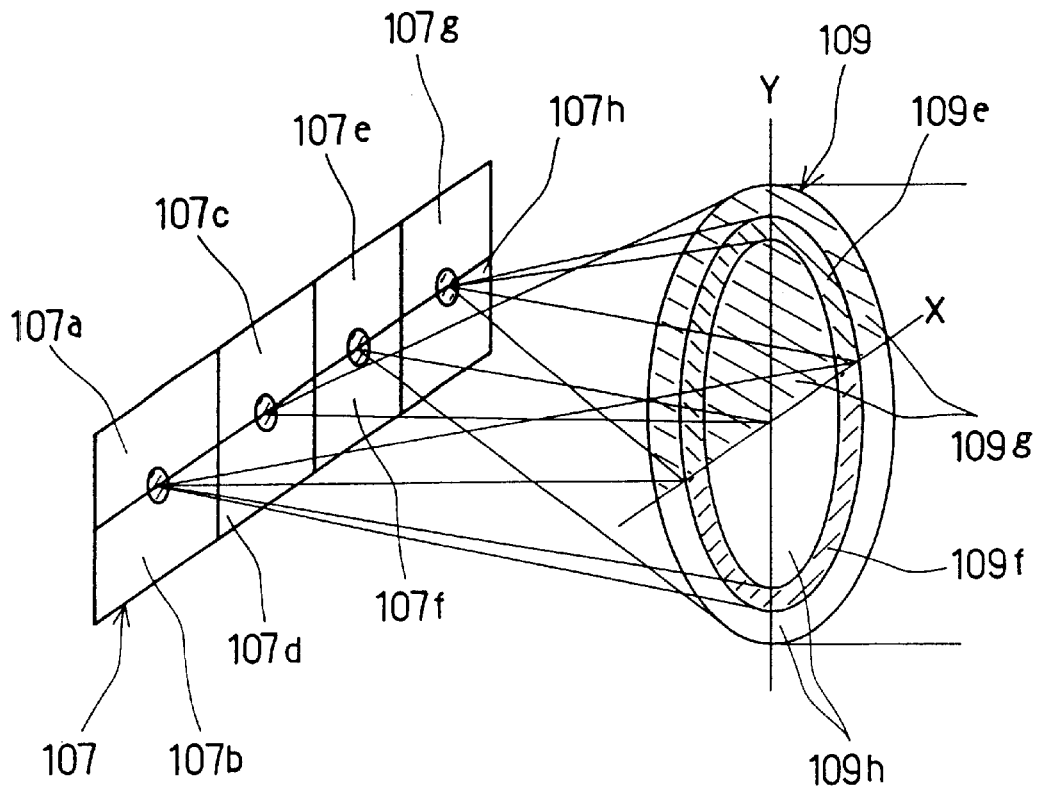
FIG. 12 is a diagram illustrating the principle for detecting spherical aberration in Embodiment 4 of the present invention.

FIG. 12 illustrates a particular way for detecting spherical aberration.

A hologram 109 is partitioned into a plurality of regions 109e–109h, and the photo-detectors 107a–107h correspond to these regions. That is, the region 109e corresponds to the photo-detectors 107g and 107h, the region 109f corresponds to the photo-detectors 107a and 107b, the region 109g corresponds to the photo-detectors 107c and 107d, and the region 109h corresponds to the photo-detectors 107e and 107f. The partitioning of the hologram 109 into different regions follows the principle illustrated by FIG. 6. Thus, to partition and deflect a plurality of light beams according to the regions they pass, for example the spatial frequency (pitch) and diffraction direction of the hologram 109 can be adjusted to suitable values for each region.

Assuming that spherical aberration occurs, the phase difference between the regions 109e and 109f and the regions 109g and 109h on the detection hologram 109 becomes maximal. Consequently, if one of these pairs of regions are measured, spherical aberration can be detected. Since the spherical aberration is symmetrical to the X-axis and the Y-axis, it can be detected with a combination of regions 109e with regions 109g and 109h. Similarly, it can be detected with a combination of regions 109f with regions 109g and 109h.

Figure 13:
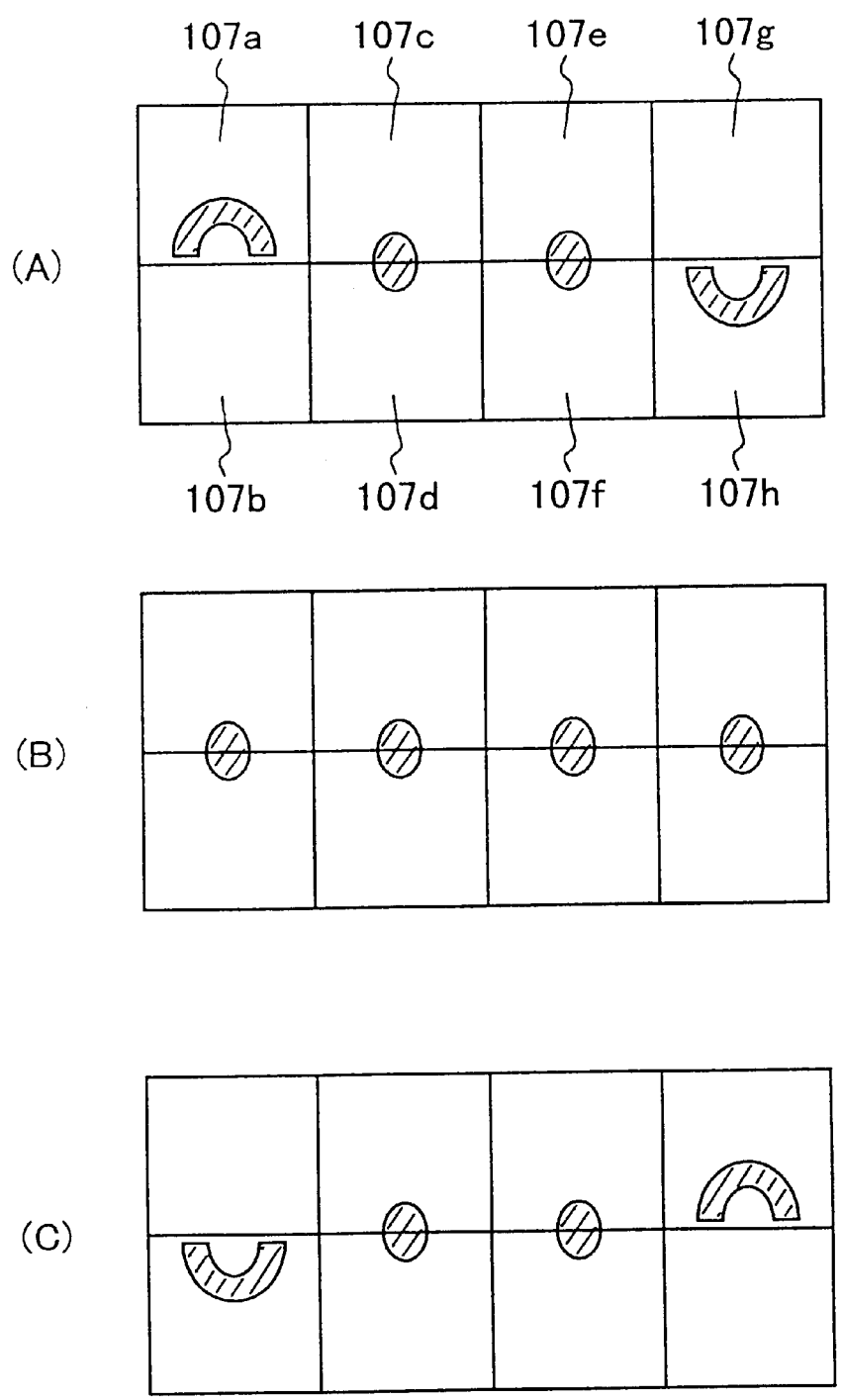
FIGS. 13(A)–(C) illustrate how the light beam spot is formed on the photo-detector of FIG. 12 during spherical aberration.

FIG. 13 illustrates the appearance of the light spot (hatched portions) due to the light beam on the photo-detector 107, onto which the light beam is focussed.

If there is no spherical aberration, the output of all photo-detectors is roughly equal, as shown in FIG. 13(B).

In the case of a spherical aberration of a certain polarity, the focus of the light beam passing the holograms 109g and 109h in FIG. 12 lies behind the photo-detector 107. As a result, the output of the photo-detectors 107a and 107h increases and the output of the photo-detectors 107b and 107g decreases, but the output of the photo-detectors 107c, 107d, 107e, and 107f stays the same, as shown in FIG. 13(A).

In the case of spherical aberration of the opposite polarity, the focus of the light beam passing the holograms 109g and 109h in FIG. 12 lies in front of the photo-detector 107. As a result, the output of the photo-detectors 107b and 107g increases and the output of the photo-detectors 107a and 107h decreases, but the output of the photo-detectors 107c, 107d, 107e, and 107f stays the same, as shown in FIG. 13(C).

Consequently, a signal of the spherical aberration detection can be obtained by processing these signals. In other words, the spherical aberration SA can be determined by $$SA=[(107a)+(107h)]-[(107b)+(107g)]$$

The far-field tracking error signal can be obtained by detecting the difference in the light amounts of the light beam passing the portion of the hologram where Y>0 and the light beam passing the portion of the hologram where Y<0. That is, the far-field tracking signal TE can be determined by $TE=[(107a)+(107b)+(107e)+(107f)]-[(107c)+(107d)+(107g)+(107h)]$ Embodiment 5

Figure 14:
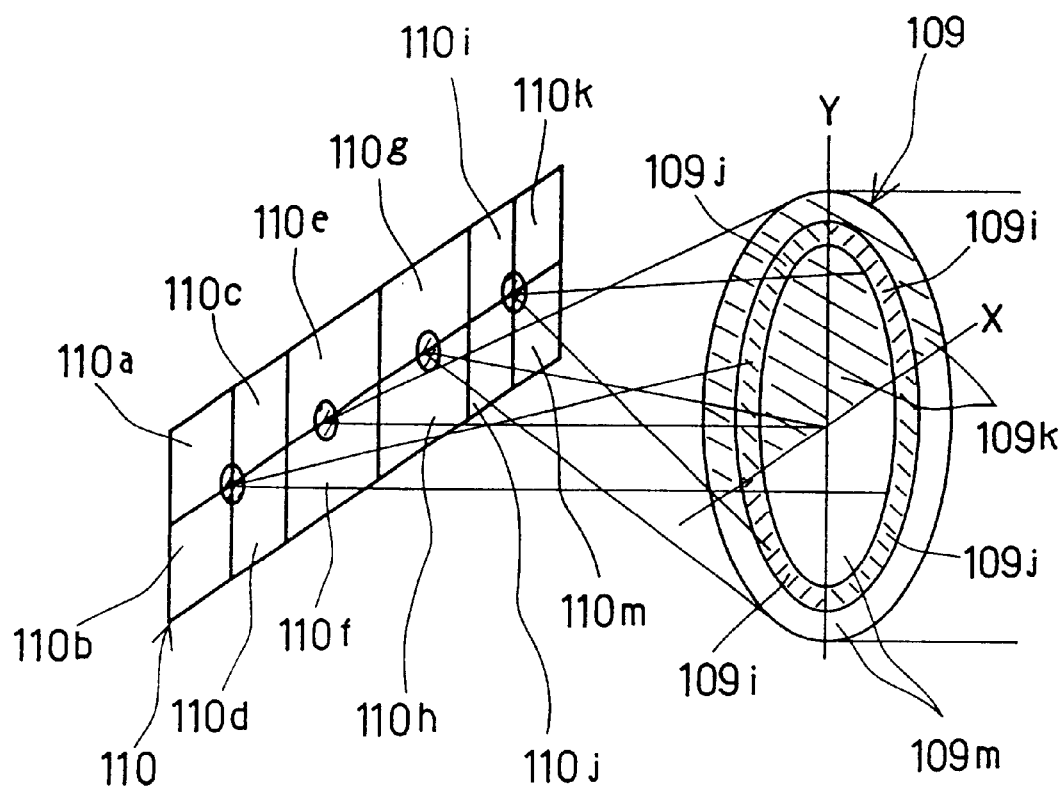
FIG. 14 is a diagram illustrating the principle for detecting astigmatism in Embodiment 5 of the present invention.

It is also possible to detect astigmatism in accordance with the principle of the present invention. FIG. 14 illustrates a particular way for detecting astigmatism.

A hologram 109 is partitioned into a plurality of regions 109i–109m (there is no section 109l), and photo-detectors 110a–110m (there is no photo-detector 110l) correspond to these regions. That is, the region 109i corresponds to the photo-detectors 110i, 110j, 110k, and 110m, the region 109j corresponds to the photo-detectors 110a, 110b, 110c, and 110d, the region 109k corresponds to the photo-detectors 110e and 110f, and the region 109m corresponds to the photo-detectors 110g and 110h. The partitioning of the hologram 109 into different regions is carried out as follows. First, the hologram is partitioned into a region bounded by two concentric circles with different radii and having the optical axis at the center (ring-shaped region) and a region outside this ring-shaped region. The ring-shaped region is then partitioned into four regions by the X-axis and the Y-axis. Opposite regions are regarded as one set, and there are two sets of detection regions, namely 109i and 109j. The region outside the ring-shaped region is partitioned into a region 109k with Y>0 and a region 109m with Y<0. Thus, to partition and deflect into a plurality of light beams according to the regions they pass, for example the spatial frequency (pitch) and diffraction direction of the hologram 109 can be adjusted to suitable values for each region.

Assuming that astigmatism occurs, the phase difference between the regions 109i and 109j on the detection hologram 109 becomes maximal, and the phase difference between the regions 109k and 109m takes on an intermediate value. Consequently, astigmatism can be detected by measuring three of these regions.

Figure 15:
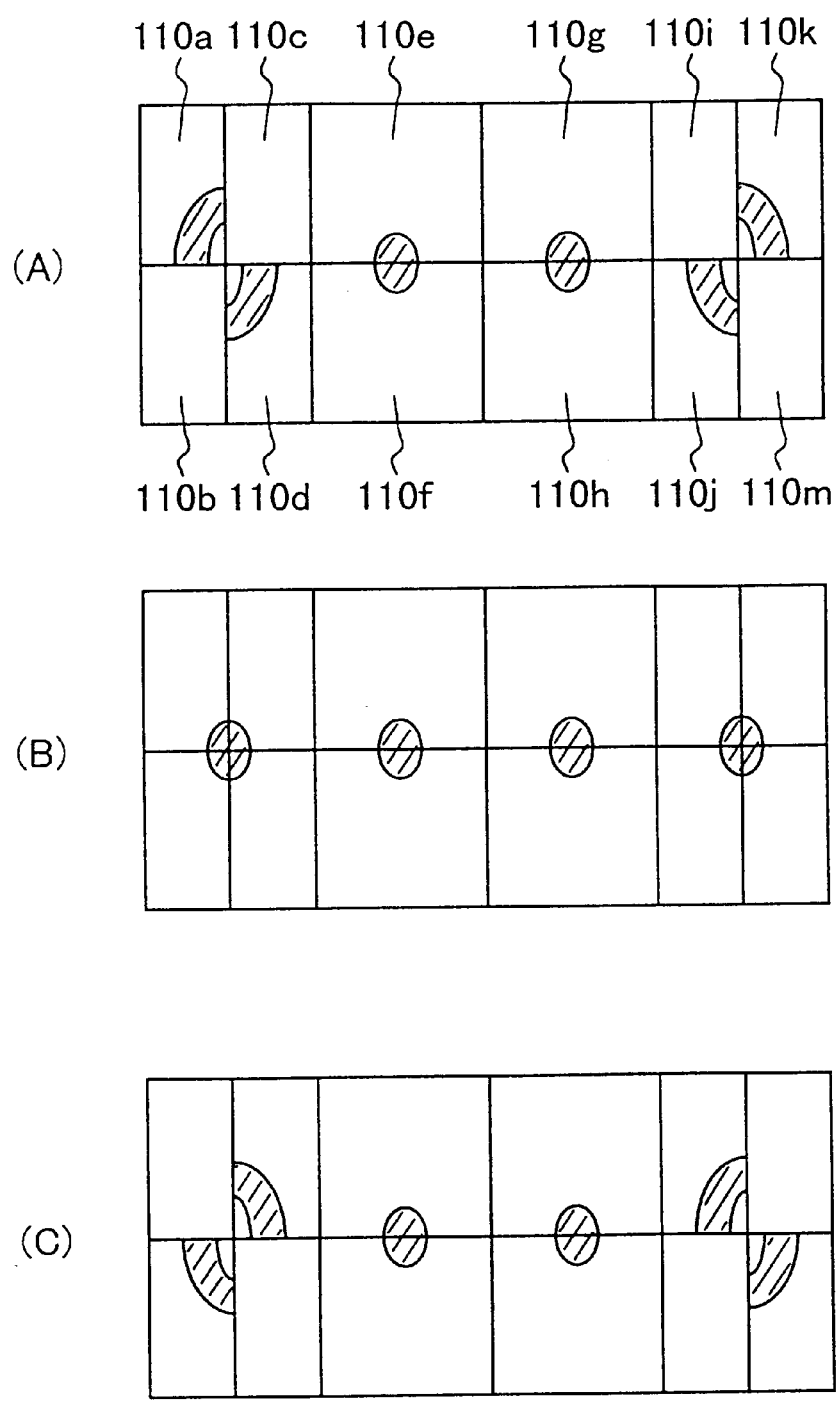
FIGS. 15(A)–(C) illustrate how the light beam spot is formed on the photo-detector of FIG. 14 during astigmatism.

FIG. 15 illustrates the appearance of the light spot (hatched portions) due to the light beam on the photo-detectors 110, onto which the light beam is focussed.

If there is no astigmatism, the output of all photo-detectors 110 is roughly equal, as shown in FIG. 15(B).

In the case of astigmatism of a certain polarity, the focus of the light beam passing the hologram 109i in FIG. 14 lies behind the photo-detectors 110 and the focus of the light beam passing the hologram 109j in FIG. 14 lies in front of the photo-detectors 110. As a result, the output of the photo-detectors 110a, 110d, 110j, and 110k increases and the output of the photo-detectors 110b, 110c, 110i, and 110m decreases, as shown in FIG. 15(A). The output of the photo-detectors 110e, 110f, 110g, 110h stays the same.

In the case of astigmatism of the opposite polarity, the focus of the light beam passing the hologram 109j in FIG. 14 lies behind the photo-detectors 110 and the focus of the light beam passing the hologram 109i in FIG. 14 lies in front of the photo-detectors 110. As a result, the output of the photo-detectors 110a, 110d, 110j, and 110k decreases and the output of the photo-detectors 110b, 110c, 110i, and 110m increases, as shown in FIG. 15(C). The output of the photo-detectors 110e, 110f, 110g, 110h stays the same.

Consequently, a signal of the astigmatism detection can be obtained by processing these signals. In other words, the astigmatism AS can be determined by $AS=[(110a)+(110d)+(110j)+(110k)]-[(110b)+(110c)+(110i)+(110m)]$ For simplification of the photo-detectors, the above embodiments, which use a hologram, have been explained by way of examples using +1 order diffractive light, or −1-order diffractive light. It is also possible to use a blazed hologram, and in this case, it can be used for the aberration detection device of these embodiments without modifications. By using a blazed hologram, the amount of light received by the photo-detectors increases, so that aberrations can be detected with greater sensitivity. Needless to say, it is also possible to use the above-noted methods for unblazed holograms. In this case, the photo-detectors have to be designed so as to prevent interference between +1-order diffractive light and −1-order diffractive light.

Moreover, if an unblazed hologram is used for the hologram 109 in Embodiment 2 (FIG. 8), photo-detectors 107 and 111 can be arranged at substantially symmetrical positions near both sides of the light source 101 so as to receive both +1-order diffractive light and −1-order diffractive light, and the above-described aberration detections can be performed with these two photo-detectors 107 and 111. With this configuration, the amount of light received is twice as high as in the case when aberrations are detected with only one photo-detector, and it is possible to achieve an aberration detection signal with a high S/N ratio.

Figure 16:
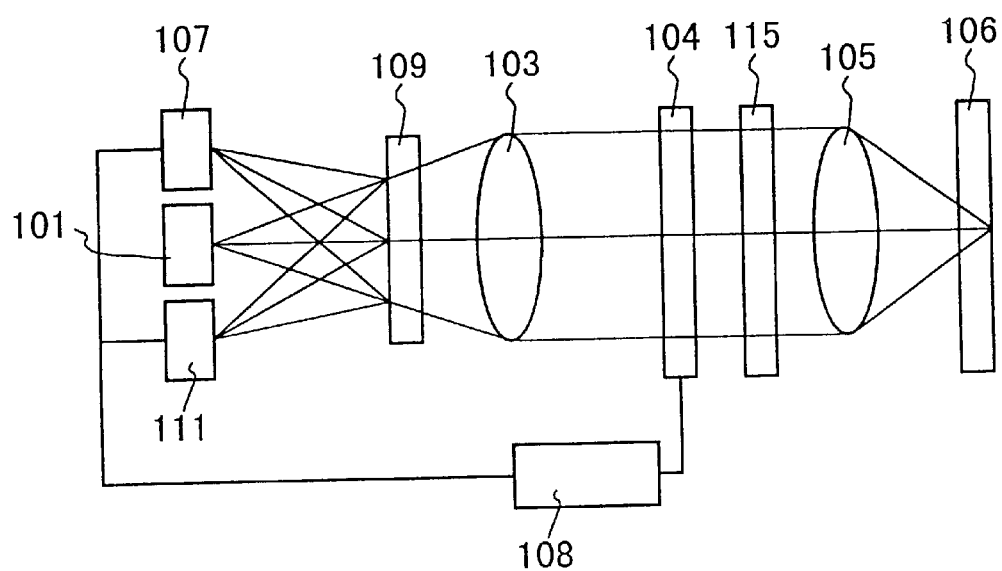
FIG. 16 is a diagram showing another example of an aberration detection device in accordance with the present invention.

Alternatively, for the hologram 109 in Embodiment 2 (FIG. 8), it is also possible to use a polarization hologram that diffracts only polarized light, and to make a light deflector with such a polarization hologram and a $\lambda/4$ plate. This is shown in FIG. 16, where a radiation source emitting polarized light is used for the light source 101, and a deflection hologram 109 is arranged so that it can transmit the polarized light emitted by the light source. Moreover, a $\lambda/4$ plate 115 is arranged between a wavefront transformer element 104 and an object lens 105. The light beam emitted from the radiation source 101 emitting polarized light is transmitted through the polarization hologram 109 and is circularly polarized by the $\lambda/4$ plate 115. The circularly polarized light beam reflected by the disk 106 again passes the $\lambda/4$ plate 115 and becomes polarized in a direction that is perpendicular to the polarization direction of the incoming light beam (that is, before the reflection by the disk 106). When this light beam enters the polarization hologram 109, almost the entire light beam is diffracted and irradiated onto the photo-detectors 107 and 111. The photo-detectors 107 and 111 are arranged at substantially symmetrical positions near both sides of the light source 101. The aberration detection is performed using the signal from both photo-detectors 107 and 111. Thus, using a polarization hologram and a $\lambda/4$ plate, the utilization efficiency for the light beam irradiated onto the photo-detectors can be increased, and an aberration detection signal with a high S/N ratio can be obtained.

Moreover, in the above-noted embodiments, methods for rapidly detecting aberrations with photo-detectors partitioned into two portions were explained, but if the response speed of the photo-detectors could be made faster, an aberration detection with higher precision can be performed using photo-detectors that are partitioned into a plurality of portions in the same direction as explained for the above embodiments. As is clear from FIGS. 10, 11, 13 and 15, when aberrations occur, the light distribution on the photo-detectors spreads out considerably. The extent of this spreading-out is proportional to the extent of the aberration. This means that the farther away from the optical axis of the light beam there is a photodetector that still registers an output, the larger is the aberration. Processing the signals that are output by the plurality of photo-detectors, an aberration correction device (wavefront transformer element 104) can be controlled and driven stepwise with analog values, and the aberration correction can be carried out with higher precision. Since the refractive index of the liquid crystal used for the aberration correction device changes substantially in proportion to the voltage applied to it, it is suitable for a device that is controlled step-wise by analog values.

Moreover, the above-noted embodiments all have been explained for the case of far-field tracking as the tracking method, but it is also possible to combine regular tracking methods, such as tracking by phase difference detection or 3-beam tracking, with a design that is not overly difficult.

The following is an explanation of an embodiment in which the above-noted aberration detection devices are applied to an optical information recording and reproducing apparatus.

Embodiment 6

Figure 17:
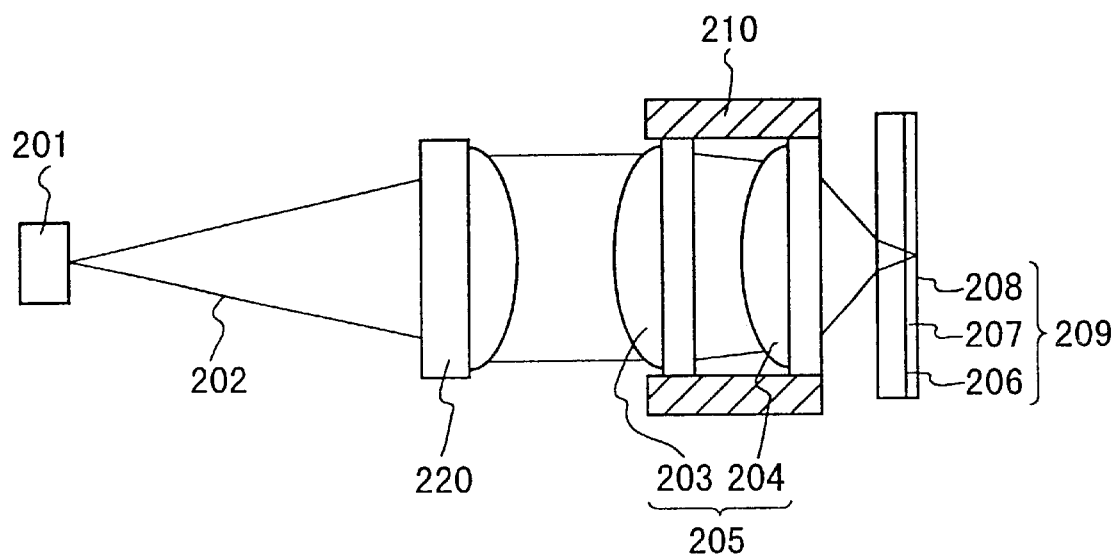
FIG. 17 is a diagram of an optical information recording device in accordance with Embodiment 6 of the present invention.

FIG. 17 is a diagram of an optical information recording apparatus in accordance with a sixth embodiment of the present invention.

In FIG. 17, a light beam 202 emitted by a semiconductor laser 201 is collimated by a collimator lens 220 into substantially parallel light, transmitted through an object lens 205 including two aspherical lenses 203 and 204, and irradiated onto an information carrier 209 including a first recordable information recording layer 206, a second recordable information recording layer 208, and an optical separation layer 207 arranged between the two information recording layers. Between the two aspherical lenses 203 and 204, there is a distance adjustment mechanism 210, with which the distance between the two lenses can be changed. The present embodiment uses a piezo element. Applying a high voltage to the piezo element increases the distance between the two aspherical lenses 203 and 204, and applying a low voltage decreases the distance between the two aspherical lenses 203 and 204. When the light beam, converged by the object lens 205, focuses on the first recordable information recording layer 206, the voltage applied to the piezo element is reduced, and the distance between the two aspheric lenses 203 and 204 is made smaller so as to correct spherical aberration. When the light beam, converged by the object lens 205, focuses on the second recordable information recording layer 208, the voltage applied to the piezo element is increased, and the distance between the two aspheric lenses 203 and 204 is made larger so as to correct spherical aberration. By reducing the spherical aberration with respect to the information recording layer with this method, favorable recording and reproducing properties can be attained.

In Embodiment 6, it is also possible to use other systems such as an electromagnetically driven actuator or a motor instead of the piezo element. Furthermore, it is also possible to use an actuator driven by ultrasonic waves instead of the piezo element.

It is also possible to use two convex lens groups or one aspherical lens and one spherical lens instead of the two aspherical lenses 203 and 204.

Embodiment 7

Figure 18:
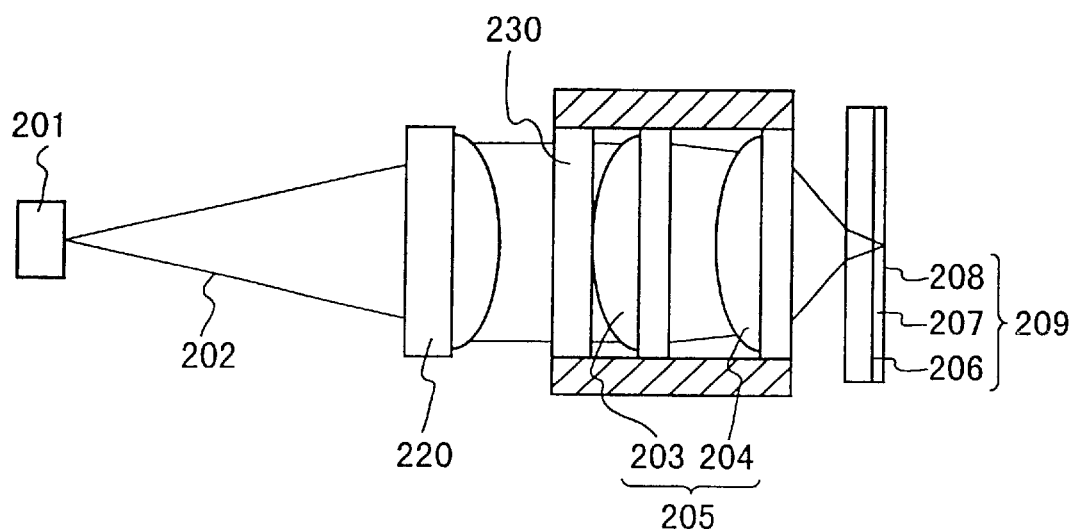
FIG. 18 is a diagram of an optical information recording device in accordance with Embodiment 7 of the present invention.

FIG. 18 is a diagram of an optical information recording apparatus in accordance with a seventh embodiment of the present invention.

In FIG. 18, a light beam 202 emitted by a semiconductor laser 201 is collimated by a collimator lens 220 into substantially parallel light, transmitted through an object lens 205 including two aspherical lenses 203 and 204, and irradiated onto an information carrier 209 including a first recordable information recording layer 206, a second recordable information recording layer 208, and an optical separation layer 207 arranged between the two information recording layers. A spherical aberration correction element 230 is arranged between the object lens 205 and the semiconductor laser 201. This spherical aberration correction element 230 can change an optical phase that is constant in the circumferential direction, but varies in the radial direction, with respect to the optical axis of the object lens 205. The spherical aberration correction element 230 is formed in one piece with the object lens 205.

Since due to the different thicknesses of the substrate a point-symmetric phase difference occurs with respect to the optical axis, the spherical aberration of the optical beam focussed onto the information recording layers can be cancelled by adding to the optical phase variation in radial direction, which is caused by the spherical aberration, an optical phase of the same amount but of opposite polarity.

In this embodiment, the spherical aberration correction element 230 is a liquid crystal element that is partitioned into three to seven regions of concentric rings centered around the optical axis. The phase difference is optimized by controlling the voltage applied to these regions in accordance with the amount of spherical aberration occurring.

In this embodiment, it is also possible to use two convex lens groups or one aspherical lens and one spherical lens instead of the two aspherical lenses 203 and 204.

Embodiment 8

Figure 19:
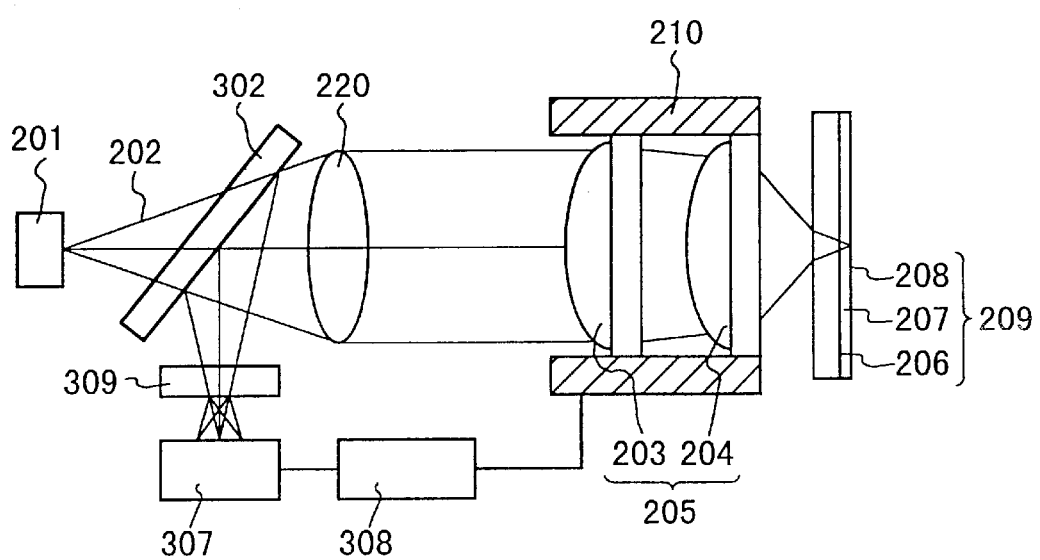
FIG. 19 is a diagram of an optical information recording device in accordance with Embodiment 8 of the present invention.
Figure 20:
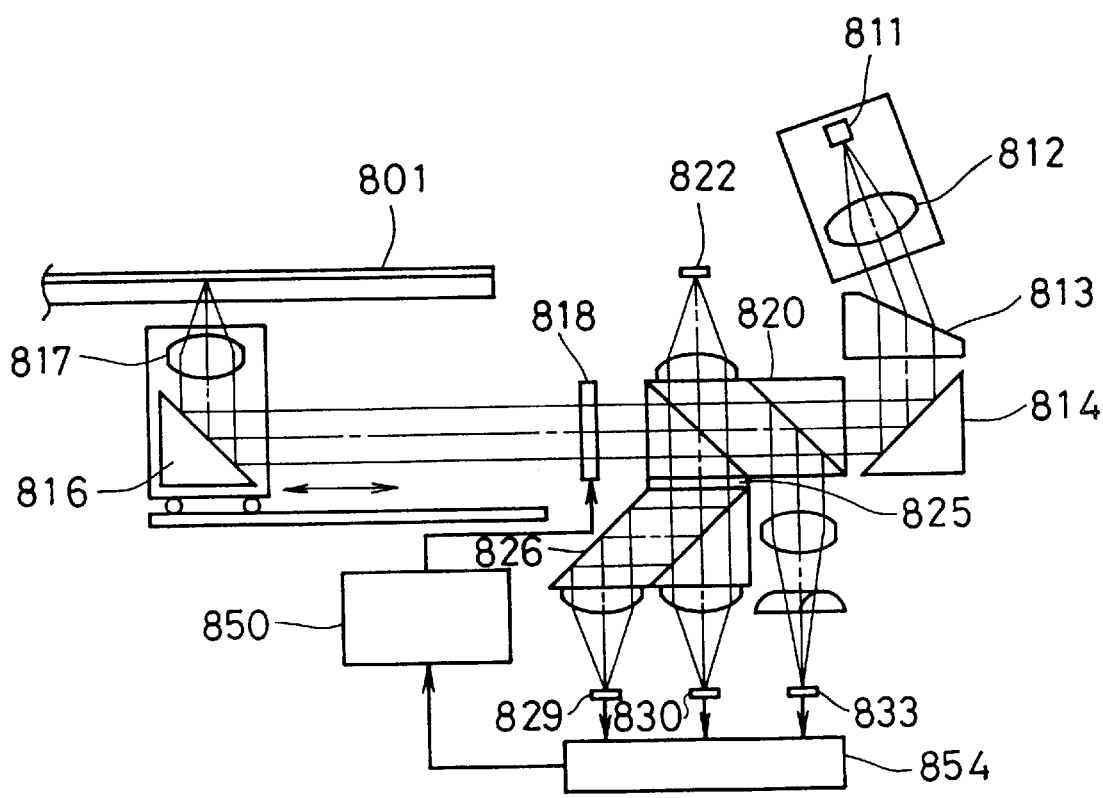
FIG. 20 is a diagram illustrating a conventional method for the correction of wavefront aberration.
Figure 21:
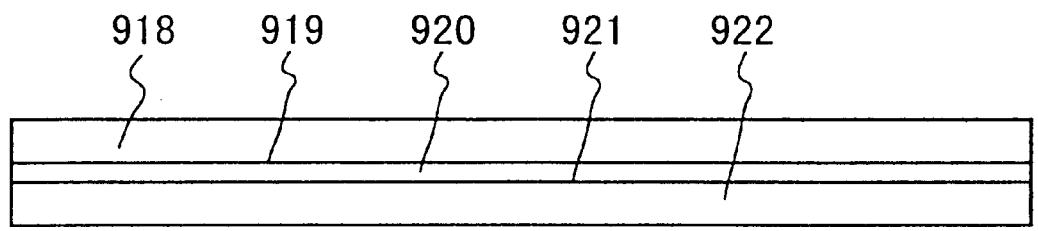
FIG. 21 is an example of a single-side double-layer optical disk.

In Embodiments 6 and 7, it is possible to use a hologram to detect the spherical aberration. Referring to FIG. 19, the following is an explanation of a method for detecting spherical aberration in an optical disk.

In FIG. 19, a light beam 202 emitted by a semiconductor laser 201 is collimated by a collimator lens 220 into substantially parallel light, transmitted through an object lens 205 including two aspherical lenses 203 and 204, and irradiated onto an information carrier 209 including a first recordable information recording layer 206, a second recordable information recording layer 208, and an optical separation layer 207 arranged between the two information recording layers. Between the two aspherical lenses 203 and 204, there is a distance adjustment mechanism 210, which keeps the distance between those two aspherical lenses constant. The present embodiment uses a piezo element for the distance adjustment mechanism 210.

The light beam reflected from the disk is reflected by a half-mirror 302, passes through a hologram 309 for aberration detection, and is irradiated onto the photo-detector 307. The detected signal is processed by a signal amplification circuit 308, and drives a piezo element 210. By applying a higher voltage in accordance with the detection signal, the distance between the two aspherical lenses 203 and 204 can be increased, and by applying a lower voltage, the distance between the aspherical lenses 203 and 204 can be decreased.

When the light beam converged by the object lens 205 focuses on the first recordable information recording layer 206, a spherical aberration detection signal is detected, and the voltage applied to the piezo element 210 is reduced to decrease the distance between the two aspherical lenses and correct the spherical aberration.

When the light beam converged by the object lens 205 focuses on the second recordable information recording layer 208, a spherical aberration detection signal of opposite polarity as the previously mentioned spherical aberration detection signal is detected, and the voltage applied to the piezo element 210 is raised to increase the distance between the two aspherical lenses and correct the spherical aberration.

As a particular way for the spherical aberration detection, it is possible to use the method illustrated in FIGS. 5–7 and explained in Embodiment 4.

In this embodiment, it is also possible to use two convex lens groups or one aspherical lens and one spherical lens instead of the two aspherical lenses 203 and 204.

In this embodiment, an example has been explained in which the optical information recording apparatus of Embodiment 6 is combined with a spherical aberration detection device, but it is also possible to combine the optical information recording apparatus of Embodiment 7 with a spherical aberration detection device.

This embodiment has been explained for the case that a spherical aberration detection device with the configuration shown in FIG. 1 is used, but it is also possible to use a spherical aberration detection device with the configuration shown in FIG. 2.

The present invention is not limited to the particular configurations shown in the drawings, but can be embodied by many different variations thereof.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An aberration detection device comprising:
   a radiation source for emitting a light beam;
   an object lens for focusing the light beam on an information carrier;
   a hologram for partitioning a returning light beam that has been reflected by the information carrier and passed through said object lens into a light beam passing a first region and a light beam passing a second region, and diffracting the light beam passing the first region away from said radiation source; and
   a plurality of light detectors for receiving a diffracted light beam passing through the first region;
   wherein said plurality of light detectors receives both a +1-order diffractive light beam and a −1-order diffractive light beam that have passed through the first region and been diffracted,
   said plurality of light detectors comprises a photo-detector partitioned into at least two portions,
   the photo-detector is arranged such that both the +1-order diffractive light beam and the −1-order diffractive light beam are irradiated onto a partition line of the at least two portions, and
   a spherical aberration, a coma aberration or an astigmatism is detected and identified individually from an output signal from the photo-detector.

2. The aberration detection device according to claim 1, wherein the first region is a substantially central portion of one of two regions that are attained by partitioning a region passed by the returning light beam with a plane including an optical axis of the returning light beam into two regions.

3. The aberration detection device according to claim 1, wherein the first region is substantially equal to one of the two regions that are attained by partitioning, with a plane including an optical axis of the returning light beam, a region that is bounded by two concentric circles of different radii whose center is an optical axis of the returning light beam.

4. The aberration detection device according to claim 1, wherein said plurality of light detectors is arranged symmetrically with regard to said radiation source and near said radiation source.

5. The aberration detection device according to claim 1, wherein said hologram comprises a polarization hologram for diffracting light of a predetermined polarization and a λ/4 plate,
   said polarization hologram does not diffract an incoming light bean emitted by said radiation source and traveling toward the information carrier, and
   said polarization hologram partitions the returning light beam into a plurality of light beams and diffracts the plurality of light beams into different directions.

6. An optical head device for (i) recording information onto a recordable and reproducible information carrier having a plurality of information recording layers, and an optical separation layer sandwiched between the information recording layers and/or (ii) reproducing the recorded information; said optical head device comprising:
   a radiation source for emitting a light beam;
   a light beam focusing system for focusing a light beam emitted by said radiation source onto at least one of the plurality of information recording layers;
   an aberration correction system for correcting an aberration of the focused light beam;
   a light beam splitter for separating a returning light beam that has been reflected by the information carrier and passed through said light beam focusing system from an incoming light beam;
   a hologram for partitioning and diffracting the returning light beam, that has been separated by said light beam splitter, into a light beam passing a first region and a light beam passing a second region; and
   a plurality of light detectors for receiving a diffracted light beam passing through the first region;
   wherein said plurality of light detectors receives both a +1-order diffractive light beam and a −1-order diffractive light beam that have passed through the first region and been diffracted,
   said plurality of light detectors comprises a photo-detector partitioned into at least two portions,
   the photo-detector is arranged such that both the +1-order diffractive light beam and the −1-order diffractive light beam are irradiated onto a partition line of the at least two portions, and
   a spherical aberration, a coma aberration or an astigmatism is detected and identified individually from an output signal from the photo-detector.

7. The optical head device according to claim 6, wherein said hologram also functions as said light beam splitter for separating the returning light beam that has been reflected by the information carrier and passed through said light beam focusing system from the incoming light beam.

8. The optical head device according to claim 6, wherein said aberration correction system is formed in one piece with said light beam focusing system.

9. The optical head device according to claim 6, wherein said aberration correction system corrects the spherical aberration.

10. The optical head device according to claim 9, wherein said aberration correction system changes the distance between lenses constituting said light beam focusing system.

11. The optical head device according to claim 9, wherein said aberration correction system is arranged between said radiation source and said light beam focusing system and can change an optical phase that is constant in a circumferential direction, and varies in a radial direction, with respect to an optical axis of said light beam focusing system.

12. The optical head device according to claim 6, wherein said aberration correction system corrects the coma aberration.

13. The optical head device according to claim 12, wherein said aberration correction system is formed in one piece with said light beam focusing system and tilts said light beam focusing system.

14. The optical head device according to claim 6, wherein said aberration correction system corrects the astigmatism.

15. An optical information recording and reproducing apparatus for (i) recording information onto a recordable and reproducible information carrier having a plurality of information recording layers, and an optical separation layer sandwiched between the information recording layers and/or (ii) reproducing the recorded information; said optical information recording and reproducing apparatus comprising:

a radiation source for emitting a light beam;

a light beam focusing system for focusing a light beam emitted by said radiation source onto at least one of the plurality of information recording layers;

an aberration correction system for correcting an aberration of the focused light beam;

a light beam splitter for separating a returning light beam that has been reflected by the information carrier and passed through said light beam focusing system from an incoming light beam;

a hologram for partitioning and diffracting the returning light beam, that has been separated by said light beam splitter, into a light beam passing a first region and a light beam passing a second region; and a plurality of light detectors for receiving a diffracted light beam passing through the first region;

wherein said plurality of light detectors receives both a +1-order diffractive light beam and a −1-order diffractive light beam that have passed trough the first region and been diffracted, said plurality of light detectors comprises a photo-detector partitioned into at least two portions, the photo-detector is arranged such that both the +1-order diffractive light beam and the −1-order diffractive light beam are irradiated onto a partition line of the at least two portions, and a spherical aberration, a coma aberration or an astigmatism is detected and identified individually from an output signal from the photo-detector.

16. The optical information recording and reproducing apparatus according to claim 15, wherein said aberration correction system is controlled so as to correct an aberration of the light beam focused onto the information recording layer.

17. The optical information recording and reproducing apparatus according to claim 15, wherein said hologram also functions as said light beam splitter for separating the returning light beam that has been reflected by the information carrier and passed through said light beam focusing system from the incoming light beam.

18. The optical information recording and reproducing apparatus according to claim 15, wherein said aberration correction system is formed in one piece with said light beam focusing system.

19. The optical information recording and reproducing apparatus according to claim 15, wherein said aberration correction system corrects the spherical aberration.

20. The optical information recording and reproducing apparatus according to claim 19, wherein said aberration correction system changes the distance between lenses constituting said light beam focusing system.

21. The optical information recording and reproducing apparatus according to claim 19, wherein said aberration correction system is arranged between said radiation source and said light beam focusing system and can change an optical phase that is constant in a circumferential direction, and varies in a radial direction, with respect to an optical axis of said light beam focusing system.

22. The optical information recording and reproducing apparatus according to claim 15, wherein said aberration correction system corrects the coma aberration.

23. The optical information recording and reproducing apparatus according to claim 22, wherein said aberration correction system is formed in one piece with said light beam focusing system and tilts said light beam focusing system.

24. The optical information recording and reproducing apparatus according to claim 15, wherein said aberration correction system corrects the astigmatism.

* * * * *

UNITED STATES PATENT AND TRADEMARK OFFICE
CERTIFICATE OF CORRECTION

PATENT NO.   : 6,661,750 B2
DATED        : December 9, 2003
INVENTOR(S)  : Saimi et al.

It is certified that error appears in the above-identified patent and that said Letters Patent is hereby corrected as shown below:

<u>Column 21,</u>
Line 37, "passed trough" should read -- passed through --

Signed and Sealed this

Eighth Day of June, 2004

JON W. DUDAS
*Acting Director of the United States Patent and Trademark Office*